(12) United States Patent
Goudy et al.

(10) Patent No.: US 9,181,043 B1
(45) Date of Patent: Nov. 10, 2015

(54) ELEVATION CHANGE SYSTEM FOR A ROTARY DEVICE

(71) Applicant: The Procter & Gamble Company, Cincinnati, OH (US)

(72) Inventors: Eric Shawn Goudy, Liberty Township, OH (US); Clifford Theodore Papsdorf, Loveland, OH (US); Roger Phillip Williams, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 6 days.

(21) Appl. No.: 14/294,514

(22) Filed: Jun. 3, 2014

(51) Int. Cl.
*B65G 47/84* (2006.01)
*B65G 29/00* (2006.01)

(52) U.S. Cl.
CPC .............. *B65G 47/846* (2013.01); *B65G 29/00* (2013.01); *B65G 2201/0244* (2013.01); *B65G 2811/0636* (2013.01)

(58) Field of Classification Search
CPC ........... B65G 29/00; B65G 2201/0244; B65G 2811/0636; B65G 47/846; B65G 47/847; B65G 47/848
See application file for complete search history.

(56) References Cited

U.S. PATENT DOCUMENTS

| | | | |
|---|---|---|---|
| 1,981,641 A | 11/1934 | Benoit | |
| 2,324,312 A | 7/1943 | Meyer et al. | |
| 3,957,154 A | 5/1976 | Shiba | |
| 4,124,112 A | 11/1978 | Mohney et al. | |
| 5,029,695 A | 7/1991 | Kovara | |
| 5,046,599 A | 9/1991 | Hamano | |
| 5,082,105 A * | 1/1992 | Tincati | B65G 47/846 198/473.1 |
| 5,540,320 A | 7/1996 | Sarto et al. | |
| 5,590,753 A | 1/1997 | Bertschi et al. | |
| 7,007,793 B2 | 3/2006 | Stocchi | |
| 7,398,871 B1 | 7/2008 | Basgil et al. | |
| 7,431,150 B2 | 10/2008 | Ranger | |
| 8,418,836 B2 | 4/2013 | Papsdorf | |
| 8,499,921 B1 | 8/2013 | Orndorff et al. | |
| 2007/0271871 A1 | 11/2007 | Spence et al. | |
| 2007/0289665 A1 * | 12/2007 | Mazzon | B65G 47/847 141/165 |
| 2011/0138613 A1 * | 6/2011 | Hahn | B65G 47/847 29/823 |
| 2011/0272246 A1 | 11/2011 | Papsdorf et al. | |
| 2013/0062163 A1 * | 3/2013 | Turlotte | B65G 43/02 198/470.1 |

FOREIGN PATENT DOCUMENTS

| | | |
|---|---|---|
| DE | 19903319 A | 8/1999 |
| EP | 0355971 B1 | 10/1993 |
| EP | 0412059 B1 | 2/1994 |
| EP | 0401698 B1 | 8/1994 |
| EP | 0659983 B1 | 7/1998 |
| EP | 0894544 A2 | 2/1999 |
| EP | 1663824 B1 | 6/2009 |
| JP | 10035879 A | 2/1998 |
| WO | WO 2005/030616 A2 | 4/2005 |
| WO | WO 2005/123553 A1 | 12/2005 |
| WO | WO 2009/040531 A1 | 4/2009 |

* cited by examiner

*Primary Examiner* — Mark A Deuble
(74) *Attorney, Agent, or Firm* — Jeffrey V. Bamber

(57) ABSTRACT

An elevation change mechanism is disclosed for adjusting the elevation of a rotatable element of a rotary device in a direction parallel to the axis about which the rotatable element rotates. The rotary device can be: a filler, capper, labeler, a star wheel conveyor, or other rotary device. In some cases, the same motor that rotates the rotary device about the axis is used to move the elevation change mechanism in a direction parallel to the axis.

15 Claims, 19 Drawing Sheets

ELEVATION CHANGE SYSTEM FOR A ROTARY DEVICE

FIELD OF THE INVENTION

The present invention relates to an adjustable rotary device for an automated article handling line, and more particularly is directed to adjustment systems and methods for adjusting the rotary device to accommodate different articles.

BACKGROUND OF THE INVENTION

Various types of rotary devices are used for handling articles on automated handling lines. On an automated handling line that involves filling bottles with liquids, for example, such rotary devices may include fillers, cappers, labelers, and star wheel conveyors. Often such rotary devices will be provided with their own drive motor, such as a servo motor, for rotating the rotary device.

It may be necessary for automated handling lines to process articles such as containers of varying shapes and sizes. This has, however, created challenges for such rotary devices. For example, in the case of many current star wheels, each star wheel can only handle containers of a specific shape and size, so this requires changing the star wheel plates or disks each time a different container is introduced onto the handling line. This is undesirable as it is both time consuming and necessitates having to keep a stock of different-sized star wheel plates. In addition, in some cases, it is desirable to adjust the elevation of rotary devices to accommodate articles of different heights. Not all rotary devices are adjustable in height. In those cases when rotary devices are adjustable in height, the adjustability, if powered, often requires a separate motor to implement the adjustment.

The patent literature describes a number of efforts to improve such devices These include, but are not limited to devices described in: U.S. Pat. No. 1,981,641; U.S. Pat. No. 2,324,312; U.S. Pat. No. 3,957,154; U.S. Pat. No. 4,124,112; U.S. Pat. No. 5,029,695; U.S. Pat. No. 5,046,599; U.S. Pat. No. 5,082,105; U.S. Pat. No. 5,540,320; U.S. Pat. No. 5,590,753; U.S. Pat. No. 7,007,793 B2; U.S. Pat. No. 7,398,871 B1; U.S. Patent Publication US 2007/0271871 A1; U.S. Pat. No. 8,418,836 and U.S. Patent Application Publication No. US 2011/0272246 A1, both published in the name of Papsdorf; DE 19903319A; EP 0 355 971 B1; EP 0 401 698 B1; EP 0 412 059 B1; EP 0 659 683 B1; EP 0 894 544 A2; EP 1 663 824 B1; JP Publication JP 10035879 A; PCT WO 2005/030616 A2; and PCT WO 2009/040531 A1. Adjustable guide rails for star wheels are also described the patent literature, including in the aforementioned U.S. Pat. No. 5,540,320 and PCT Publication WO 2005/030616 A2, as well as in U.S. Pat. No. 7,431,150 B2; PCT WO 2005/123553 A1; and U.S. Pat. No. 8,499,921, Orndorff.

The search for improved mechanisms for adjusting rotary devices has, however, continued. In particular, it is desirable to provide a rotary device that has a simple adjustment system that has increased flexibility to handle articles having many different sizes and configurations, and is less expensive to manufacture and/or operate than star wheels with multiple change parts, and other automatic adjustment options for such devices.

SUMMARY OF THE INVENTION

The present invention relates to an adjustable rotary device for use on an automated article handling line, and more particularly is directed to adjustment systems and methods for adjusting a rotary device to accommodate different articles.

Two different types of adjustment systems for adjusting a rotary device are described herein. Each of these comprises an invention in its own right. The adjustment systems can be used independently in which case only one of the adjustment systems is used with a rotary device. Alternatively, they can be used together in order to adjust different aspects of the rotary device.

A rotational adjustment system that may be a low cost way for adjusting the angular displacement of one or more rotatable elements of a rotary device is disclosed herein. The rotary device can comprise any of various types of rotary devices are used for handling articles on automated handling lines. On an automated handling line that involves filling bottles with liquids, for example, such rotary devices may include, but are not limited to: fillers, cappers, labelers, and star wheel conveyors. The rotational adjustment system comprises a rotational adjustment mechanism that may cooperate with other components of the rotary device such as the drive motor. The rotational adjustment mechanism comprises an adjustment element that may be movable to engage one or more of the rotatable elements of the rotary device. In the case of a star wheel conveyor, for example, the adjustment element may assist in adjusting the rotational position of the individual rotatable element(s) and in setting the dimensions of pockets for the articles to be conveyed. In some cases, the rotational adjustment mechanism may further comprise a support and the adjustment element may be movably joined to the support.

An elevation adjustment system for adjusting the elevation of at least one rotatable element of a rotary device is also disclosed herein. The system may adjust the position of the rotatable element(s) in a direction parallel to the axis about which the rotatable element rotates (for example, the vertical displacement of the rotatable element(s)). The elevation adjustment system may comprise an elevation adjustment mechanism. The elevation adjustment mechanism may be positioned to at least indirectly engage at least one rotatable element in order to adjust the elevation of the rotatable element or elements.

The rotary device will typically comprise a main drive motor for rotating the device. In some cases, the adjustment systems described herein may utilize the existing main drive motor that rotates the rotary device to adjust the rotational position and/or elevation of the rotatable element(s) of the rotary device. This may provide an economic advantage and provide automatic adjustment at a very modest cost by using a motor that already exists on the rotary device to assist in performing the adjustments.

Methods for adjusting the rotational position and/or the elevation of one or more rotary elements on a rotary device are also described herein. The methods may comprise a step (a) of providing a system comprising a rotary device and at least one of a rotational or elevation adjustment (or elevation change) mechanism. If a rotational adjustment mechanism is provided, the method may further comprise a step (b) of moving an adjustment element and/or rotating a rotatable element so that the adjustment element engages one or more rotatable elements to adjust the rotational position of the rotatable element. If an elevation adjustment mechanism is provided, the elevation change mechanism may be selectively engageable with the mechanism for rotating the rotatable element, and the mechanism for rotating the rotatable element may also be arranged to impart motion to the elevation change mechanism. In such a case, the elevation adjustment method may further comprise a step (b) of engaging the elevation change mechanism with the mechanism for rotating the rotatable element and activating the mechanism for rotating the rotatable element so that the elevation change mechanism moves in the direction of the axis about which the rotatable element rotates.

BRIEF DESCRIPTION OF THE DRAWINGS

The following detailed description will be more fully understood in view of the drawings in which.

Figure 1:
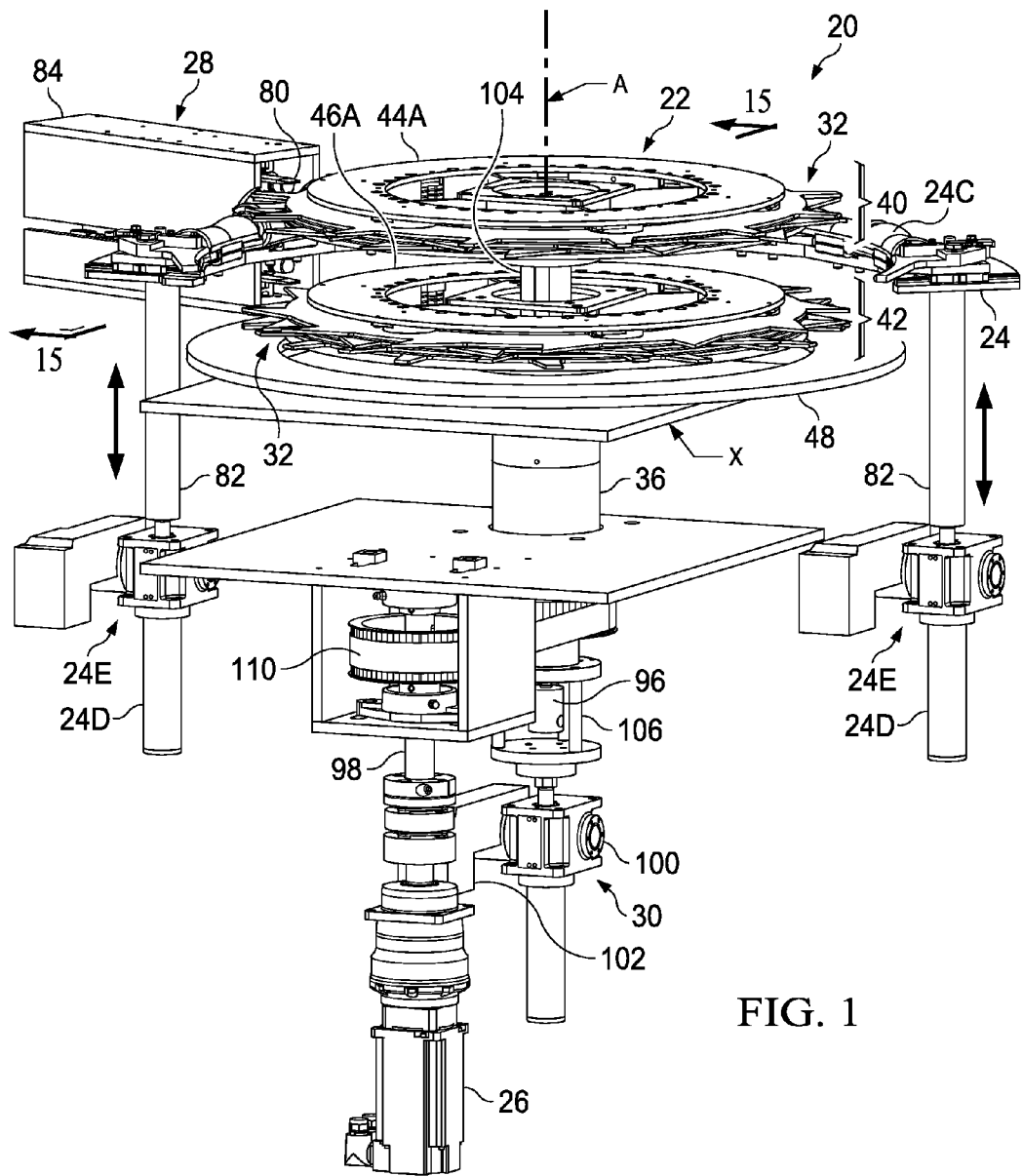
FIG. 1 is a perspective view showing an adjustable star wheel together with one version of an adjustment system for adjusting the adjustable star wheel to accommodate different articles.

The embodiments of the system shown in the drawings are illustrative in nature and are not intended to be limiting of the invention defined by the claims. Moreover, the features of the invention will be more fully apparent and understood in view of the detailed description.

DETAILED DESCRIPTION

The present invention relates to an adjustable rotary device for an automated article handling line, and more particularly is directed to adjustment systems and methods for adjusting the rotary device to accommodate different articles.

The rotary device can comprise any of various types of rotary devices that are used for handling articles on automated handling lines. On an automated handling line that involves filling bottles with liquids, for example, such rotary devices may include, but are not limited to: fillers, cappers, labelers, and star wheel conveyors. For purposes of illustration, the inventions are shown and described in conjunction with an adjustable star wheel conveyor (the "star wheel"). It is understood that the present invention is not limited to use with star wheels, and can be used (as applicable) with any suitable rotary device.

Figure 2:
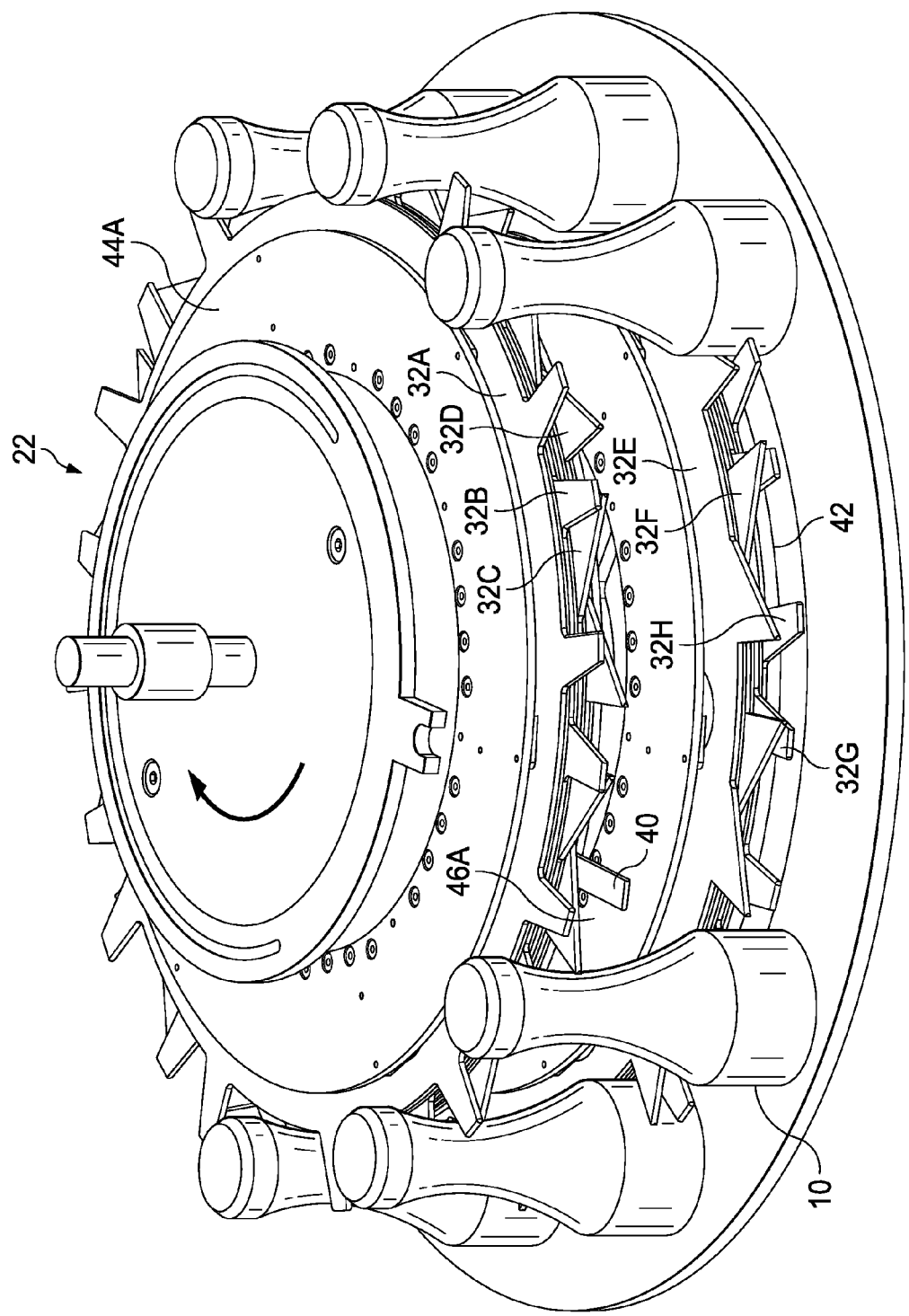
FIG. 2 is a perspective view of the adjustable star wheel with several bottles in the pockets formed by the rotatable elements.

FIG. 1 shows one non-limiting version of a system 20 comprising an adjustable star wheel 22 for conveying three dimensional articles around an arcuate path. In the embodiment shown in FIG. 1, the system comprises: the adjustable star wheel 22; an adjustable guide rail assembly 24 comprising a guide rail 24C; a main drive motor 26 for rotating the star wheel 22; and two different types of adjustment systems, a rotational adjustment system comprising a rotational adjustment mechanism 28 and an elevation adjustment system comprising an elevation adjustment mechanism 30 for adjusting the adjustable star wheel 22 to accommodate different size and/or shape articles 10. The articles 10 are shown in FIG. 2.

The Star Wheel Conveyor

The star wheel conveyor 22 can have any suitable configuration. The star wheel conveyor 22 can comprise certain known star wheel configurations, or it can comprise a star wheel of the type described in greater detail herein. However, if the adjustment mechanisms 28 and 30 described herein are to be retrofit on known rotary devices, certain modifications to such rotary devices may be required so that they are suitable for use with the adjustment systems described herein. The properties these devices should have are described in further detail below. In addition, if the rotary device comprises a star wheel 22 that is used to convey containers having necks, it may be desirable for the star wheel 22 to be of a type that is configured to contact the sides of containers below the necks of the containers and of a type that does not hold the containers by their necks. Thus, the star wheel 22 may be free of article neck-engaging components.

The star wheel 22 can be used to convey numerous different types of three dimensional articles 10. Such articles include, but are not limited to: bottles, cans, containers, razors, razor blade heads and handles, tampon tubes, deodorant stick containers, bags, cartons, and pucks and carriers which convey other articles within. While the star wheel 22 can easily transport conventionally-shaped articles (e.g., cylindrical, and/or symmetrical articles), the star wheel 22 shown in FIG. 1 is particularly suited to transport and control articles having shapes that are challenging to transport by other types of star wheels. The star wheel 22 can, for example, be used to transport: bottles with non-flat or rounded bottoms that would be unstable on a horizontal surface; bottles with small bases that will easily tip; bottles with angled and/or off-center necks; asymmetrical bottles; bottles of non-constant cross-section, etc.

The adjustable star wheel 22 shown in FIGS. 1 and 2 may have relatively few moving parts and may accommodate a wide variety of different size and shape articles. The star wheel conveyor 22 comprises a plurality of rotatable elements, which may be in the form of rotatable star-shaped disks or plates. The rotatable elements are designated generally by reference number 32. The rotatable elements, disks 32, are rotatable in a plane of rotation about an axis A. The rotatable disks 32 are stacked and have a common center through which the axis A passes. The articles are typically conveyed with their bases in a given plane. The axis A is perpendicular to the plane of article conveyance and the plane of rotation. The disks 32 have a difference in elevation or spacing therebetween in a direction parallel to the axis A so that each disk 32 lies in a different plane. The disks 32 are rotatable around a drive shaft 36 that is aligned with axis A. Each of the disks 32 may be configured to at least partially rotate in the clockwise and/or counterclockwise direction around the drive shaft 36.

The rotatable elements 32 are not limited to elements in the form of disks. The rotatable elements 32 can be in any suitable configuration that is capable of being adjusted by rotating to form pockets for the articles. Although the examples of the rotatable elements may be described herein as disks, this is for convenience only, and it is understood that any other suitable rotatable element configuration can be used. Non-limiting examples of other suitable rotatable element configurations for star wheels are shown in U.S. Pat. No. 8,418,836, Papsdorf. In certain embodiments, however, it may be desirable for the rotatable elements 32 to be free of key holes, or holes containing gears, that are used to set the configuration of the pockets for the articles. Other types of rotary devices, such as fillers, cappers, and labelers, may have completely different types of rotatable element(s), such as rotatable turrets. These other devices may also have different types of spaces or sites for holding articles (that is, other than pockets). For example, in a filler, an article such as a bottle may sit in a space on a platform, and be clamped at its top and bottom. The phrase "sites for holding articles" may be used herein to generically cover pockets or such other types of spaces for the articles.

Figure 6A:
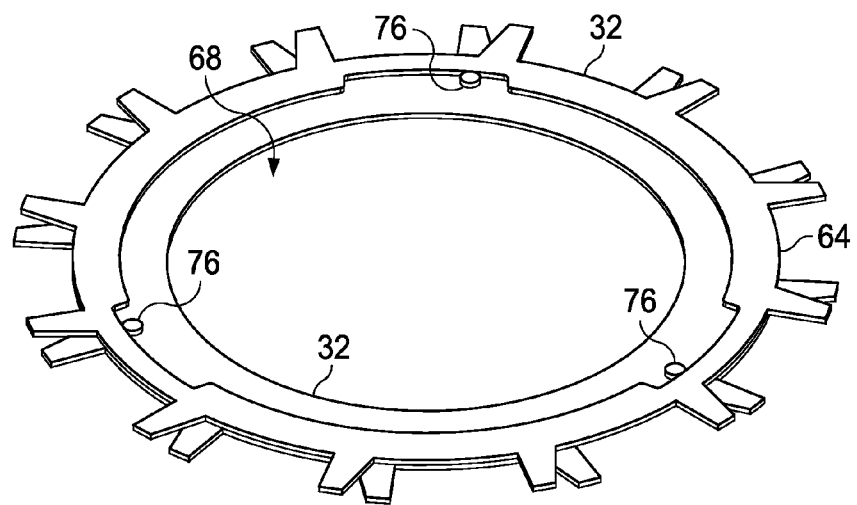
FIG. 6A is an enlarged perspective view of a portion of a star wheel having an alternative embodiment of a mechanism for maintaining concentricity between rotatable elements without using a central shaft.
Figure 6:
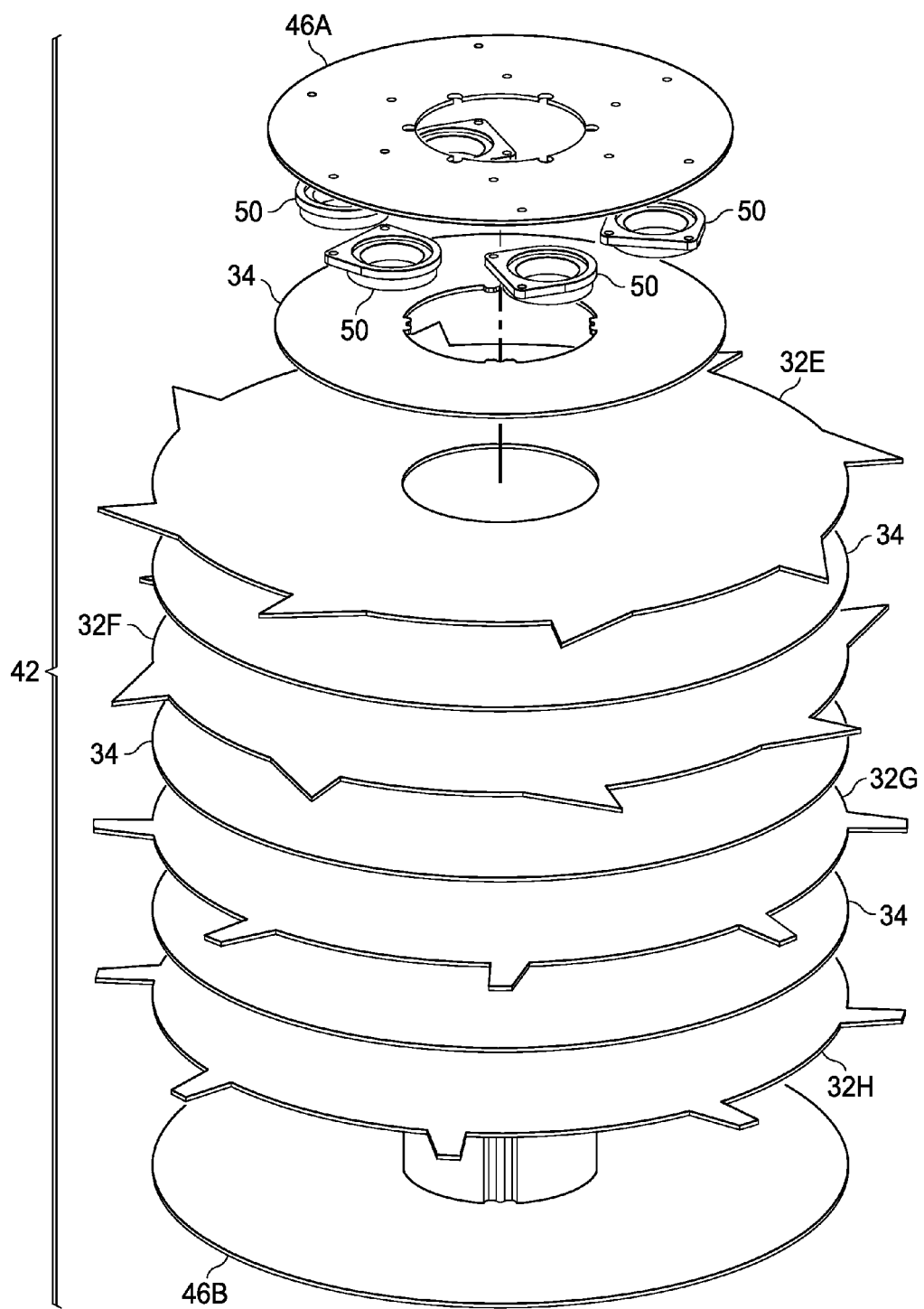
FIG. 6 is an exploded perspective view showing the components that comprise the upper assembly of the star wheel shown in FIGS. 1 and 2.

The rotary devices of interest herein will comprise at least one rotatable element. The star wheel 22 may comprise any suitable number of rotatable elements 32. In certain embodiments, it may be desirable for the star wheel 22 to comprise at least four, five, six, seven, eight, or more rotatable disks. In the version of the star wheel 22 shown in FIGS. 1 and 2, the star wheel 22 comprises eight rotatable disks 32. The disks 32 are more specifically designated in FIG. 2 as first disk 32A, second disk 32B, third disk 32C, fourth disk 32D, fifth disk 32E, sixth disk 32F, seventh disk 32G, and eighth disk 32H. Numerous variations are possible. In one variation of this embodiment, the first disk 32A can be eliminated. As shown in FIG. 6, each disk is separated by a clutch plate 34.

Figure 3:
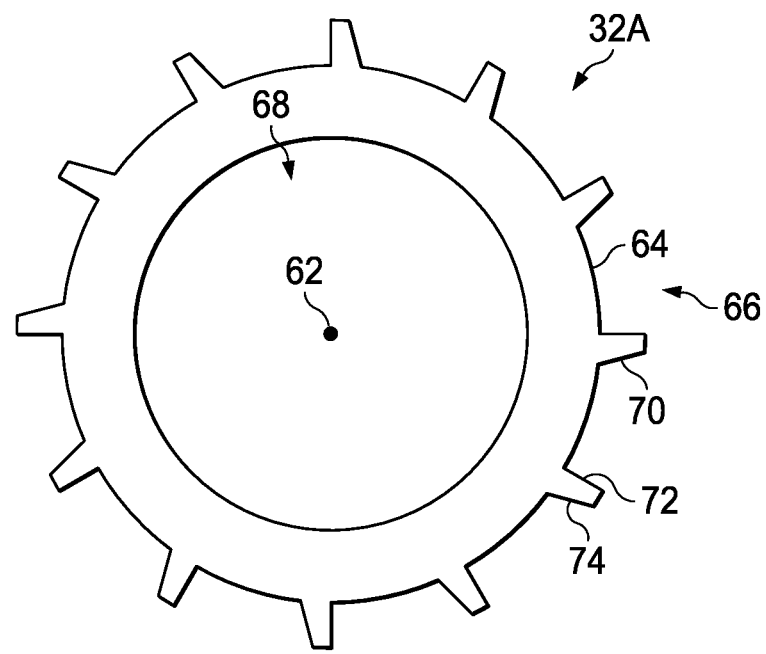
FIG. 3 is a plan view of a rotatable element having a first configuration.
Figure 4:
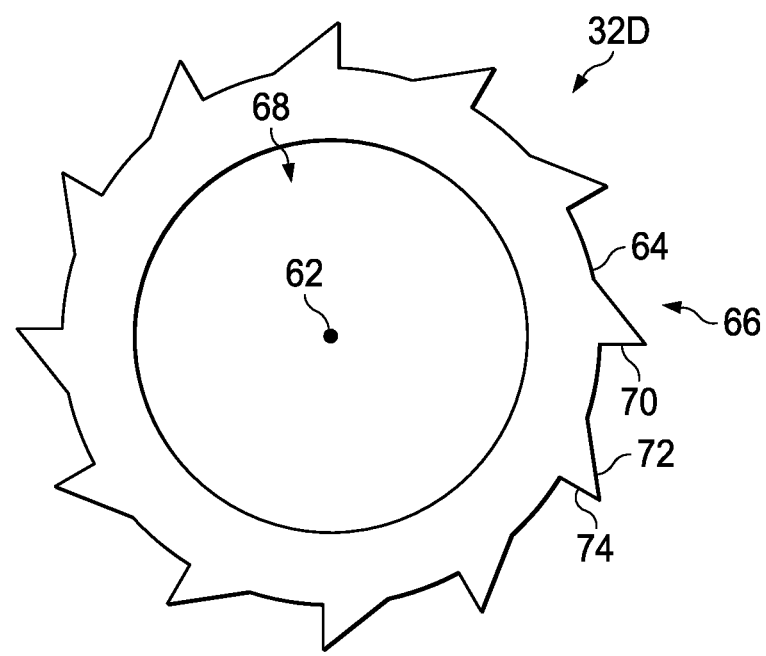
FIG. 4 is a plan view of a rotatable element having a second configuration.

In the version of the star wheel 22 which is shown in the drawings, the various rotatable elements (e.g., disks) 32 in the stack of rotatable elements will typically have at least two different configurations. In various embodiments, there can be any suitable number of different disk 32 configurations ranging from two, three, four, five, six, or more, different disk configurations up to a different disk configuration equal to the total number of disks 32. The different disks 32 can have any suitable configurations. FIGS. 3 and 4 show that in this particular embodiment where eight disks are used, there are basically two different disk configurations. The two basic configurations are that of disk 32A shown in FIG. 3 and disk 32D shown in FIG. 4. Disks 32A, 32B, 32G, and 32H all have the same configuration, a first configuration, which may be referred to herein as a U-shaped configuration. Disks 32C, 32D, 32E, and 32F all have the same configuration, a second configuration, which may be referred to herein as a V-shaped configuration. These particular disks 32 may be thought of as resembling circular saw blades with gaps (where there are no teeth) between their "teeth-like" projections. The disks 32 of the adjustable star wheel 22, of course, need not be sharp edged. In fact, rounding of the edges may prevent scratching and damage to the articles.

As shown in greater detail in FIGS. 3 and 4, each disk 32 has a central axis or center 62 and a periphery 64. The disks 32 may have at least one recess 66 in their periphery 64. In some cases, the center 62 of the disks 32 has an opening 68 for the shaft 36. The shaft 36 can have a relatively small diameter, or it can be large in diameter, nearly filling the area of the disks 32 up to the recess(es) 66. In the latter case, this would result in disks 32 that resemble rings. The opening 68 in the disks 32 for the shaft 36 may be circular, or in any other suitable configuration. It is possible to create an alternative construction of a star wheel assembly that uses another means of maintaining concentricity between disks 32 and transmitting torque without piloting the disks 32 to a shaft 36. For example, as shown in FIG. 6A, the disks 32 could be piloted around pins, such as three or more pins 76 that support the disks 32 inside of opening 68, or around the periphery 64. In other cases, the disks 32 may not have an opening for a shaft, but may still be rotatable (independently and as a group) about the axis, A, that passes through their centers. In any case, the disks 32 are independently rotatable for adjustment, as well as being collectively rotatable as a group in order to transport articles.

Alternatively, or additionally to having at least one recess 66 in their periphery 64, the disks 32 may have an element or projection 70 joined to the periphery 64 and extending outwardly therefrom to form the "point" of the star configuration. The disks 32 can have any suitable number of points. The term "joined to", as used in this specification, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The projection 70 may, thus, be considered to comprise part of the periphery 64. The term "joined to", when considering the various other components of the rotary device and adjustment systems therefor, may also encompass configurations in which an element is movably secured to another element, as well as configurations in which two elements are coupled (e.g., mechanically coupled to each other directly, or through one or more other elements).

The projection 70 that forms the star configuration need not terminate in a point, but may terminate in rounded, flat, or other configurations. It should be understood, however, that the rotatable elements 32 need not have a configuration that resembles a star. The portion of the disks 32 that form the recess 66, and/or the element 70 extending outwardly from the periphery 64 forms at least one control or contact surface 72 for assisting in controlling at least the location, and if needed, the orientation of the three dimensional article 10 being conveyed. The element 70 may also have an opposing side 74 opposite the control surface 72. The opposing side 74 of the element 70 may have a configuration that extends generally outward from the center 62 of the disk to facilitate interaction with the rotational adjustment mechanism 28 described in greater detail below. The term "generally outward", as used herein, includes, but is not limited to extensions that lie on the line representing the radius of the disk, and also includes extensions that form any suitable angle with the radius of the disk 32.

The control surface 72 is located on or near the periphery 64 of the disk 32. The control surfaces 72 on the various disks 32 together form at least one pocket 60 within which the articles 10 being conveyed may be held. There can be any suitable number of pockets 60 formed by the rotatable elements 32. Suitable numbers of pockets 60 can range from one or more, up to sixty, or more, pockets, depending on the size of the rotatable elements 32 and the size of the articles 10 being conveyed. A typical range of the number of pockets 60 may be from about 4-15 pockets. In the embodiment shown in the drawings, there are 12 pockets. Further details of the control surfaces of suitable disks are described in U.S. Pat. No. 8,418,836, Papsdorf.

Figure 5:
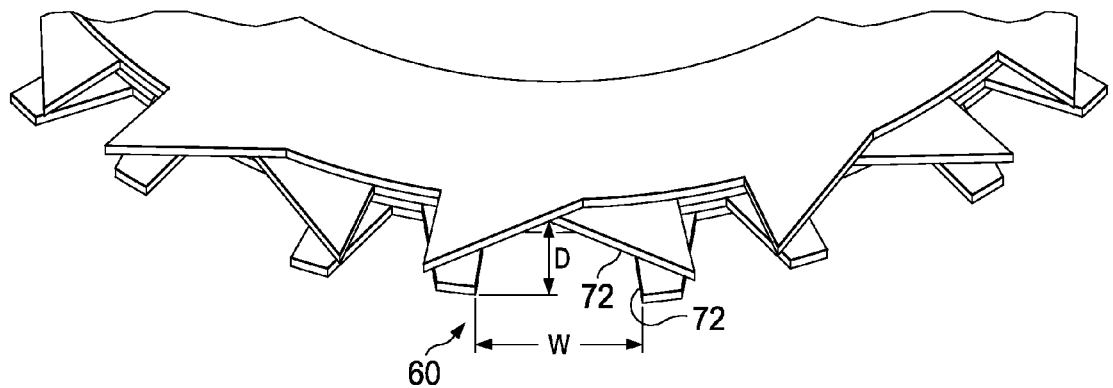
FIG. 5 is an enlarged fragmented perspective view of several rotatable elements showing the formation of pockets for articles.

As shown in FIG. 5, the pocket 60 has a width, W, and a depth, D. It should be understood, however, that the width W and depth D of the pocket 60 may vary at the different planes defined by the different disks 32 from the top to the bottom of the star wheel 22 to accommodate the configuration of the different portions of the cross-section of the articles 10 being conveyed.

The disks 32 with the different configurations can be stacked from top to bottom in any suitable order and orientation. Two or more of the disks 32 with the same configuration may be adjacent to each other in the stack of disks 32. Alternatively, the disks with the same configuration may be arranged so that they are not adjacent and there is at least one disk of a different configuration therebetween. The disks 32 with the same configuration may have the same side of the disk facing upward. Alternatively, depending on the configuration of the disks, one or more of the disks 32 may be flipped so that a different side of the disk 32 faces upward.

The disks 32 engage the articles 10 on the side of the articles facing inward (that is, the disks 32 engage the side of the articles that is facing toward the axis of rotation A). In the embodiment shown, the disks 32 are arranged to have the control surfaces 72 that describe the width W of the bottle pocket (32A, 32B, 32G, and 32H) at the highest and lowest points of the stack of disks to maximize control of the article 10 against tipping. In some cases, it may be desirable for the rotatable elements, disks 32 to be positioned to engage the articles at locations that are above the bottom 10%, 15%, 20%, or more, of the height of the article. The disks 32 having control surfaces 72 that define the depth D of the pocket (32C, 32D, 32E, and 32F) are placed in the middle.

The star wheel 22 may comprise one or more distinct assemblies or groups of rotatable elements, such as disks 32. The star wheel 22 shown in FIGS. 1 and 2 comprises two assemblies of rotatable elements 32. In this case, the star wheel conveyor 22 comprises an upper assembly 40 of rotatable elements 32, and a lower assembly 42 of rotatable elements 32. The upper assembly 40 and the lower assembly 42 can each be located between an upper plate and a lower plate. The upper and lower plates of the upper assembly 40 are designated by reference numbers 44A and 44B, respectively (see FIG. 15). The upper and lower plates of the lower assembly 42 are designated by reference numbers 46A and 46B, respectively. The star wheel 22 may further comprise a base plate 48 to support the articles 10 as they are transported. The different assemblies may be used for any suitable purpose, such as to support different portions of the articles 10 being conveyed. The two assemblies of disks may, for example, form pockets 60 that fully support the article 10 being conveyed at two general elevations. In certain cases, the different assemblies of rotatable elements 32 can also be used as part of the elevation change mechanism for adjusting the height of the rotatable elements 32 to provide more flexibility in accommodating a range of article heights from small to large articles.

The upper assembly 40 of rotatable elements and the lower assembly 42 of rotatable elements can each comprise any suitable number of rotatable elements 32. Suitable numbers of rotatable elements can comprise one or more rotatable elements 32 in each assembly. For example, the number of rotatable elements may range from between two and ten, or more, for each assembly. The number of rotatable elements 32 in the upper and lower assemblies 40 and 42 can be the same, or different. It is also possible for there to be more than two assemblies of rotatable elements 32—for instance 3, 4, 5, or more assemblies. In certain versions of the star wheel 22, the rotatable elements 32 in one or more of the assemblies may be movable with respect to other assemblies in a direction parallel to the axis, A, about which the rotatable elements 32 rotate (for example, in the direction of the arrows in FIG. 1 so the assemblies can be adjusted in height). Each assembly can be individually adjustable for relative elevation as needed for best supporting and controlling position of the articles. In other, less desired embodiments, the star wheel conveyor 22 may only comprise a single assembly of rotatable elements, without any elevation change mechanism for adjusting the height of the rotatable elements 32.

As shown in FIG. 2, in this particular embodiment, eight disks 32 are arranged in two vertically stacked assemblies or sets of four disks, with disks 32A to 32D forming an upper set of disks, and disks 32E to 32H forming a lower set of disks. In this case, each assembly 40 and 42 contains four disks: two U-shaped disks and two V-shaped disks. This particular star wheel 22 (when the configuration of the pockets 60 is set and the disks 32 are locked in place to prevent relative rotational movement between disks) will be rotating clockwise in order to transport the bottles 10. It should be understood that in other embodiments, the star wheel 22 may also, or alternatively, be capable of rotating in the counterclockwise direction. The overall rotation of the combination of disks as a unit to transport articles should not be confused with the rotation of the individual disks 32. It should, thus, be understood, that each of the individual disks 32 may be capable of at least partially rotating relative to the set in both the clockwise and counterclockwise directions in order to set the configuration of the pockets 60 to fit the article 10 being conveyed.

FIG. 6 shows the components that comprise the lower assembly 42 of the star wheel shown in FIGS. 1 and 2. This is one of many possible configurations for the lower assembly 42. In this case, the lower assembly 42 comprises four rotatable disks 32E to 32H, which are separated by clutch plates 34. The lower assembly 42 also comprises the upper plate 46A and the lower plate 46B. The lower assembly 42 further comprises a locking mechanism, which may comprise at least one locking element 50. The locking element(s) 50 lock the rotatable disks 32 of the lower assembly 42 in place in order to prevent them from rotating with respect to each other once their position is set. The components of the lower assembly 42 may be considered to comprise a compression and release mechanism or a clutch assembly. The upper assembly 40 may comprise a similar arrangement of components as the lower assembly 42.

Figure 7:
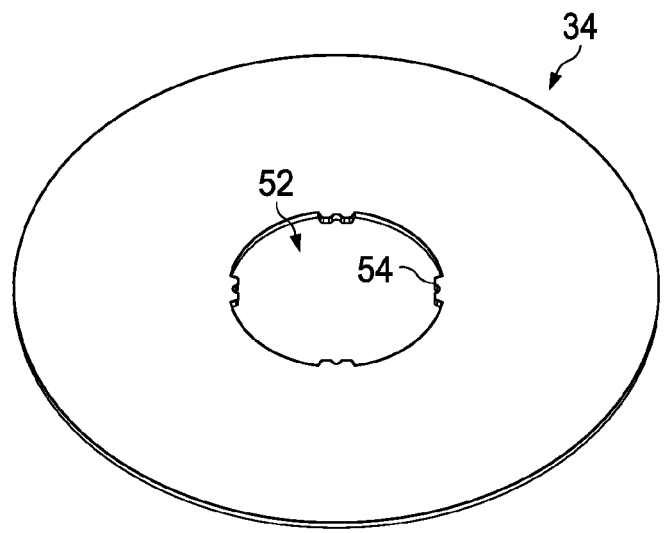
FIG. 7 is a perspective view of a clutch plate.
Figure 8:
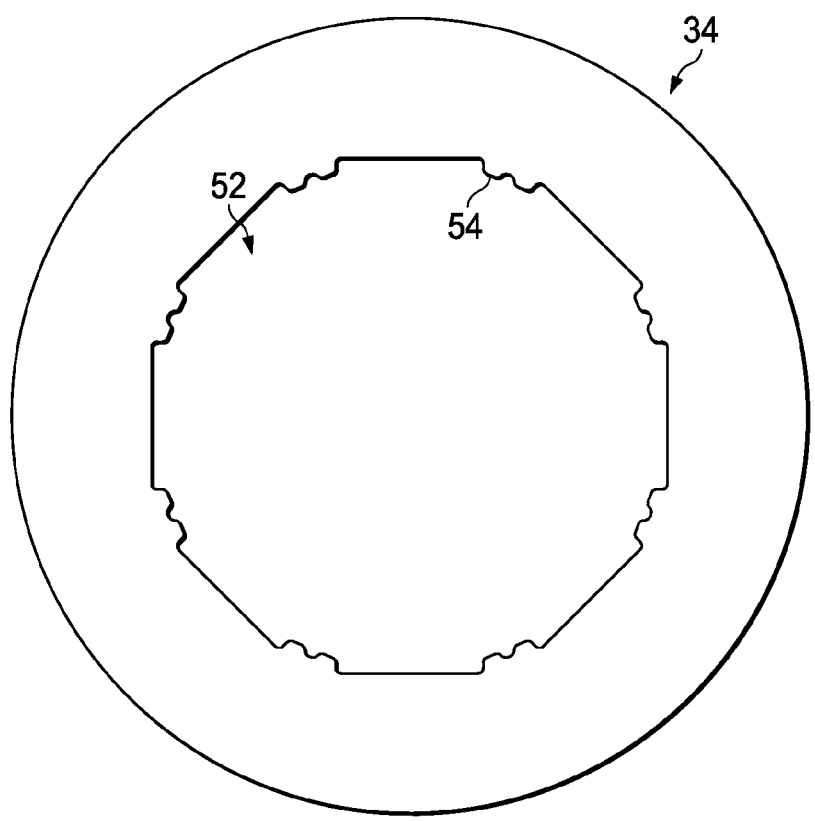
FIG. 8 is a plan view of an alternative clutch plate.

The assemblies of the star wheel 22 can be analogized to sandwiches, within which are rotatable elements (disks) 32 and clutch plates 34. FIG. 7 shows one non-limiting example of a clutch plate 34. As shown in FIG. 7, the clutch plate 34 may have a hole 52 in its center. The portion of the clutch plate 34 adjacent to the hole 52 may have at least one key 54 projecting inward toward the central axis of the clutch plate. This key 54 can fit into a longitudinal groove extending along the center shaft 36. FIG. 8 shows a clutch plate 34 having an alternative key 54 configuration. (In still other embodiments, the shaft 36 could have a projection, and the hole in the center of the clutch plate 34 could have one or more recesses in its periphery to mate with the projections on the shaft 36.) The clutch plates 34 may, thus, be keyed onto the center shaft 36, so whenever the center shaft 36 rotates, the clutch plates 34 have to rotate. The rotatable elements, disks 32 are not keyed, so when the locking mechanism is disengaged the disks 32 can be held stationary while the center shaft 36 is rotating so that the disks 32 will not turn. This allows for rotational adjustment of the disks 32. The clutch plates 34 are made from a material that allows the disks 32 to slip past each other when the locking mechanism 50 is disengaged, but prevents the disks 32 from slipping relative to each other when the locking mechanism 50 is engaged. As a result, when the locking mechanism 50 is actuated, the disks 32 will rotate with the clutch plates 34.

FIG. 6 shows one embodiment for alternate stacking of the clutch plates 34 and disks 32. The advantage of this alternating arrangement is that relative rotation of an individual disk 32 does not disturb the relative rotation of the adjacent disk 32 above or below. The alternating clutch plates 34 are non-rotatable relative to each other. This prevents relative rotational motion of a single disk from influencing the relative rotation of other disks 32 above or below. This makes is it possible to independently adjust relative rotation of an individual disk 32.

The locking mechanism 50 can comprise any suitable mechanism for preventing the disks 32 from slipping relative to each other when the star wheel is transporting articles. The locking mechanism 50 can be of a type that applies a compressive force perpendicular to the stack of disks 32 and clutch plates 34. Any suitable mechanism can be used to apply force perpendicular to the stack. The compressive force generates friction which prevents the disks 32 from rotating relative to each other (or the drive shaft). The locking mechanism 50 can be positioned in one of the following locations: on top of the stack of disks; within the stack of disks; or, beneath the stack of disks. In this case, the locking element(s) 50 comprise at least one air cylinder, such as the pancake air cylinders shown. In the embodiment shown, the locking element(s) 50 are positioned between the upper plate 44A and the uppermost disk 32A. More specifically, two or more (e.g., six) pancake air cylinders are located between these two plates. In addition to creating axial compressive force for locking with air cylinders, force can alternatively be generated with springs, hydraulic cylinders, air bags, magnets, electro-magnets, etc.

It is possible to engage and disengage locking of the disks 32 relative to the center shaft 36 by varying the embodiment shown in FIG. 6. It is possible to vary the number and position of clutch plates 34. For instance only 1, 2, 3, 4, or more clutch plates 34 can be employed. Clutch plates 34 can be eliminated and the lower plate 44B or upper plate 44A alone could be used to provide the necessary driving friction to couple the disks 32 with the center shaft 36. In another alternative embodiment, locking between the disks 32 and the center shaft 36 can be achieved by radial displacement of friction of interlocking elements instead of by axial clamping perpendicular to the stack of disks 32.

The adjustable star wheel 22 can be adjusted in any suitable manner to accommodate articles, such as bottles 10, with different shapes. In the embodiment shown, the width W of the star wheel pocket 60 can be adjusted by rotating disks 32A, 32B, 32G, and 32H. To accommodate a wider article, such as bottle 10, disks 32A and 32B are rotated in opposite directions so that their control surfaces 72 move away from each other. The depth D of the star wheel pocket 60 is adjusted by rotating disks 32C, 32D, 32E, and 32F. To accommodate a deeper bottle, disks 32C, 32D, 32E, and 32F are rotated so that the angled portions of the disks move away from each other to create a deeper pocket. Often, the cross sectional shape of a bottle will change with elevation. For instance, as shown in FIG. 2, the bottle 10 might have a wider base and smaller top. In this case, the upper and lower sets of disks can be adjusted independently to create a large pocket for the bottom and a smaller pocket for the top. Bottles can also be asymmetric about the vertical central plane. In this case, the disks 32C, 32D, 32E, and 32F with larger angled contact surfaces can be adjusted to varying depths to create an asymmetric pocket 60. Thus, adjusting the relative rotation of all eight disks 32 creates a fully amorphous star wheel pocket 60 that will adjust to virtually any article shape that fully supports the article 10 at two elevations.

In the star wheel 22 described herein, the boundaries of the pockets 60 may be configured solely by at least partially rotating at least some of the disks 32 to adjust the angular displacement or location of the control surfaces 72 on the different disks. The control surfaces form a pocket 60 that is configured to generally follow the contour of the three dimensional article being conveyed. The position of the disks 32 is then fixed before rotating the star wheel conveyor 22 to transport the articles 10. All of the adjustments to set the width W and depth D of the pockets 60 are made by rotational movement around the central axis, A. The star wheel conveyor 22 may, therefore, be free of elements that are radially movable inwardly and outwardly (toward and away from the central axis) to form the boundaries of the pocket. The star wheel conveyor 22 may also be free of grippers or elements that have a pivoting axis that pivot about a point that is at a location other than the axis of rotation of the star wheel or that of the rotatable elements 32. The adjustable star wheel conveyor 22, thus, has relatively few moving parts, and the adjustment of the width and depth of the pockets can be controlled by a single mechanism.

The upper and lower plates 44A, 44B, 46A, and 46B of the respective upper and lower assemblies 40 and 42 may have a diameter that is less than or equal to the portions of the disks 32 without the projections 70. The base plate 48, if present, will typically have a larger diameter than the disks 32. In this embodiment, the upper and lower plates and base plate 48 all rotate with the star wheel assembly when the pocket size is fixed. However, it should be understood that the rotating the base plate 48 is optional, and in other embodiments, the rotatable base plate 48 could be replaced by a flat stationary plate that may, for example, be larger than the remaining portions of the star wheel, and the articles 10 may slide on such a stationary base plate. Providing a rotating base plate 48 may, however, eliminate this sliding and any accompanying scuffing of the bottom of the articles 10.

The disks 32 and the plates (the clutch plates 34, the upper and lower plates, and the base plate 48) can be made of any suitable materials, or combinations of materials. Suitable materials include, but are not limited to metals and plastics, such as: stainless steel; aluminum (e.g., anodized aluminum); acetal resin (such as DuPont's DELRIN® acetal resin); polycarbonate; and fiber reinforced polymer (such as a carbon fiber epoxy laminate). The disks 32 and the clutch plates 34 may be made of the same materials, or they may be made from different materials. In some cases, for example, the disks 32 can be made of stainless steel and the clutch plates 34 can be made of DELRIN® acetal resin. The disks 32 and the plates can be machined in the desired configuration, and then assembled together along with the other components of the star wheel conveyor 22 by any suitable known manufacturing methods.

At least one of the rotatable elements, such as disks 32 may rotate at least part of a revolution in a clockwise direction, a counterclockwise direction, or in both directions. The fact that the disks 32 may rotate in both directions allows the disks to rotate at least slightly to bring the contact or control surfaces 72 in contact with, or in close proximity to, the article being conveyed. The disks 32 may, but need not, be able to rotate 360 degrees in both clockwise and counterclockwise directions. The disks 32 may, for example, rotate less than 360 degrees in the clockwise direction to bring the control surfaces 72 in contact with the article being conveyed. It should be understood that even though the term "contact" may be used in this specification, often one or more of the disks 32 may not actually contact the article 10. In such cases, the disks 32 may merely be "brought into proximity with" the articles 10. It also may be desirable for some processes to provide a generous clearance between the articles 10 and the control surfaces 72. The disks 32 may then rotate counterclockwise once the position of the article has been fixed in the star wheel conveyor, in order to convey the article. Alternatively, the disks 32 may rotate less than 360 degrees in the counterclockwise direction to bring the control surfaces 72 in contact with the article being conveyed. The disks may then rotate clockwise once the position of the article has been fixed in the star wheel conveyor, in order to convey the article.

The mechanism for rotating the rotatable elements may comprise at least one motor 26 joined to (that is, operatively connected to) a drive shaft 36 to turn one or more of the rotatable elements, such as disks 32. The motor 26 can comprise any suitable type of motor. Suitable types of motors include, but are not limited to: gear motors, servo motors, stepper motors, DC motors, hydraulic motors, and air motors. The term "gear motors", as used herein, refers to motors having a gear box. In certain cases, the motor may comprise a servo motor. The motor 26 may be in any suitable location. In the embodiment shown, the motor 26 is located beneath the stack of disks 32. The motor 26 can also be coupled to the drive shaft 36 by another power transmission means including drive belts, timing belts, a chain, gears, couplings, universal joints, magnetic couplings, etc. Alternatively, the motor can be coupled directly to any of the rotating components of the adjustable star wheel 22 including but not limited to upper plate 44, lower plate 46, base plate 48, clutch plates 34, rotatable element 32, etc. In some of these alternative arrangements, it is possible to eliminate the drive shaft 36 entirely and still drive the star wheel assembly 22.

Two different types of adjustment systems are provided for adjusting the rotary device, such as an adjustable star wheel, to accommodate different size and/or shape articles. These comprise a rotational adjustment system and an elevation adjustment system. The adjustment systems can be used independently in which case only one of the adjustment systems is used with a rotary device. Alternatively, they can be used together in order to adjust different aspects of the rotary device.

The Rotational Adjustment System

The system including the rotary device, such as the star wheel conveyor system 20, may comprise a rotational adjustment system. In the case of a star wheel 22, the rotational adjustment system is used for at least assisting in adjusting the configuration of the pockets 60 of the star wheel 22 to accommodate different size and/or shape articles. A rotational adjustment system is an alternative to those cases in which the star wheel 22 has one or more individual motors (or additional motors other than the drive motor) that are used to adjust the rotational position of the rotatable elements 32.

The rotational adjustment system may comprise a rotational adjustment mechanism 28. If the rotational adjustment mechanism 28 is the only adjustment mechanism present (or if it serves dual or more purposes as described in greater detail below), it may be referred to simply as the "adjustment mechanism" 28. The rotational adjustment mechanism 28 may adjust, or assist in adjusting (that is, it may cooperate with other components of the star wheel system 20 in adjusting) the configuration of the pockets 60 of the star wheel 22 to accommodate different size and/or shape articles. The phrase "at least assist in" is intended to include both adjusting and assisting in adjusting the configuration of the pockets.

The rotational adjustment mechanism 28 may be in operational communication with the rotatable elements 32. The term "operational communication", as used herein, refers to any type of relationship between the rotatable elements 32 and the rotational adjustment mechanism 28 that permits the rotational adjustment mechanism 28 to at least assist in setting the rotational position of one or more of the rotatable elements 32. The rotational adjustment mechanism 28 may act on the rotatable elements 32 in any suitable manner including, but not limited to: by contacting a rotatable element; by applying a frictional force or torque to the rotatable elements 32; by applying force or torque to a rotatable element without contacting the rotatable element (such as by air jets, electric field, or magnetic attraction or repulsion); or by any other suitable mechanism. The rotational adjustment mechanism 28 may, thus, be a mechanical mechanism.

Figure 13:
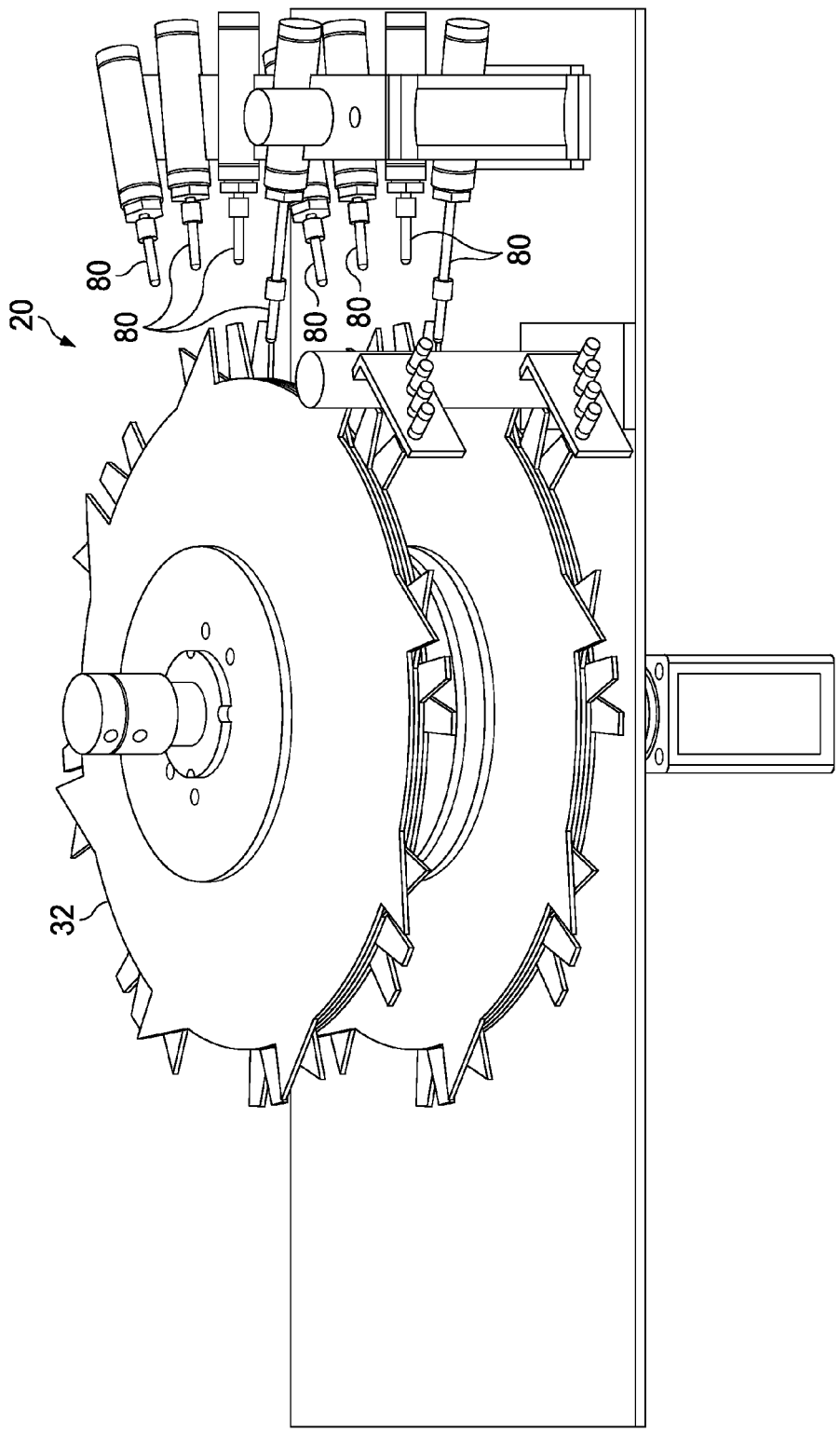
FIG. 13 is a perspective view of a star wheel system comprising multiple alternative adjustment elements.
Figure 14:
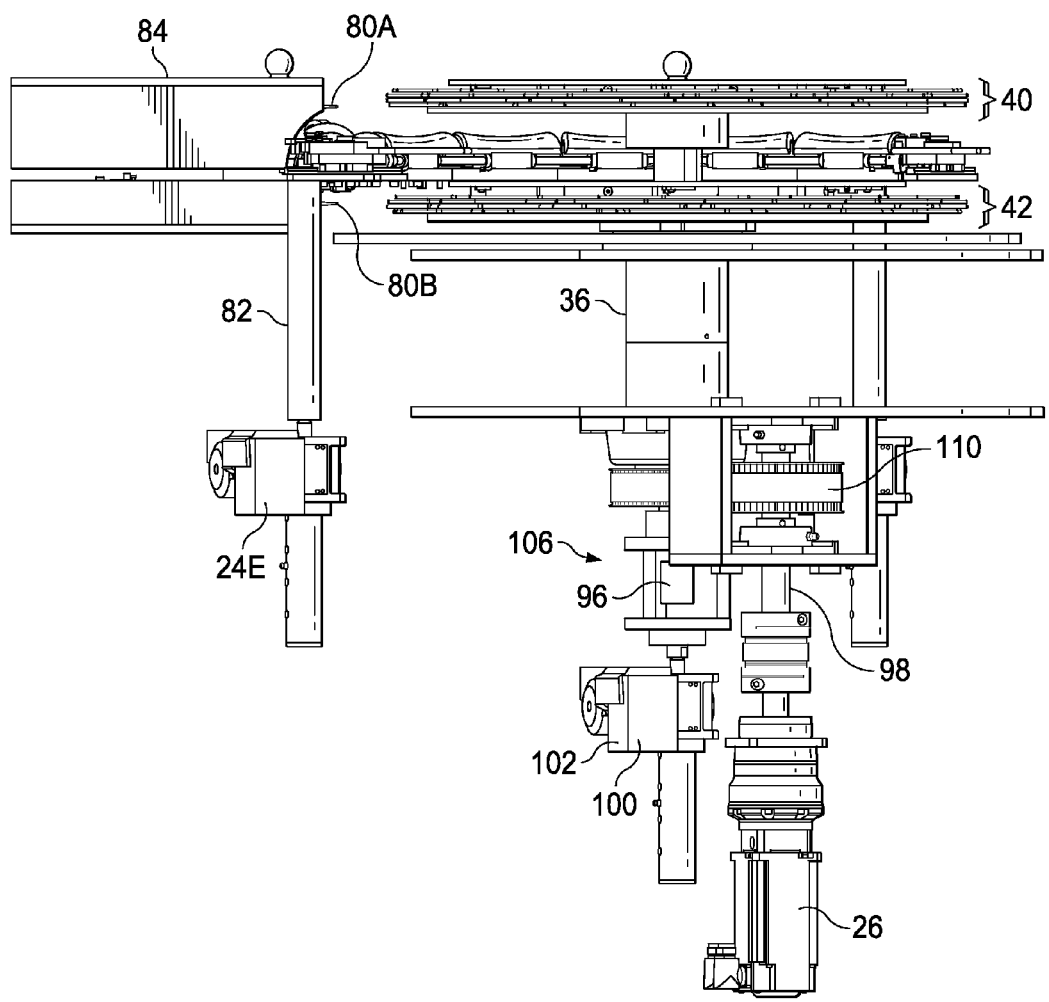
FIG. 14 is a side view of the star wheel and adjustment system shown in FIG. 1.

The rotational adjustment mechanism 28 can be any suitable type of device having any suitable configuration. The rotational adjustment mechanism 28 may comprise at least one adjustment element designated generally by reference number 80 in FIG. 1. There can be any suitable number of adjustment elements 80, including as shown in FIG. 13, up to one or more adjustment elements 80 for each rotatable element 32. In the embodiment in FIG. 1, as shown in greater detail in FIG. 9, there are two adjustment elements 80A and 80B which may be located in one or more optional housings 84. In this case, the upper adjustment element 80A reaches over the guide rail 24C to adjust the rotatable elements 32 in the upper assembly 40. The lower adjustment element 80B reaches under the guide rail 24C to adjust the rotatable elements 32 in the lower assembly 42. The adjustment elements 80A and 80B may be movable to engage one or more of the rotatable elements 32 in order to at least assist in adjusting the rotational position of the individual rotatable elements 32 to set the dimensions of pockets 60 for the articles to be conveyed.

The adjustment mechanism 28 may further comprise an optional support 82 wherein at least one adjustment element 80 is joined to the support 82. The support 82 provides a structure to hold the adjustment element 80 at the desired level relative to the rotatable elements 32. The adjustment element(s) 80 may be at fixed levels relative to the rotatable elements 32, and need not be provided with the ability to move with respect to the support 82. In other embodiments, the adjustment element(s) 80 may be movably joined to the support 82. In the later cases, the support 82 may provide a structure along which the adjustment element(s) 80 can move parallel to the axis of rotation of the rotary device (for example, vertically up and down) in order to bring the adjustment element(s) 80 to the desired level adjacent to the rotatable elements 32. The support 82 may be joined to a rigid stationary (non-moving) structure such as the machine frame or to the ground. Alternatively, the support 82 could be attached to a structure that is movable relative to the ground which moves independently of the rotation of the adjustable star wheel 22. In either case, any rotation of the star wheel 22 will result in relative motion between the star wheel 22 and support 82. Likewise, any rotation of the rotatable elements 32 will result in relative motion between the rotatable elements 32 and adjustment element 80 joined to the support 82.

Figure 11:
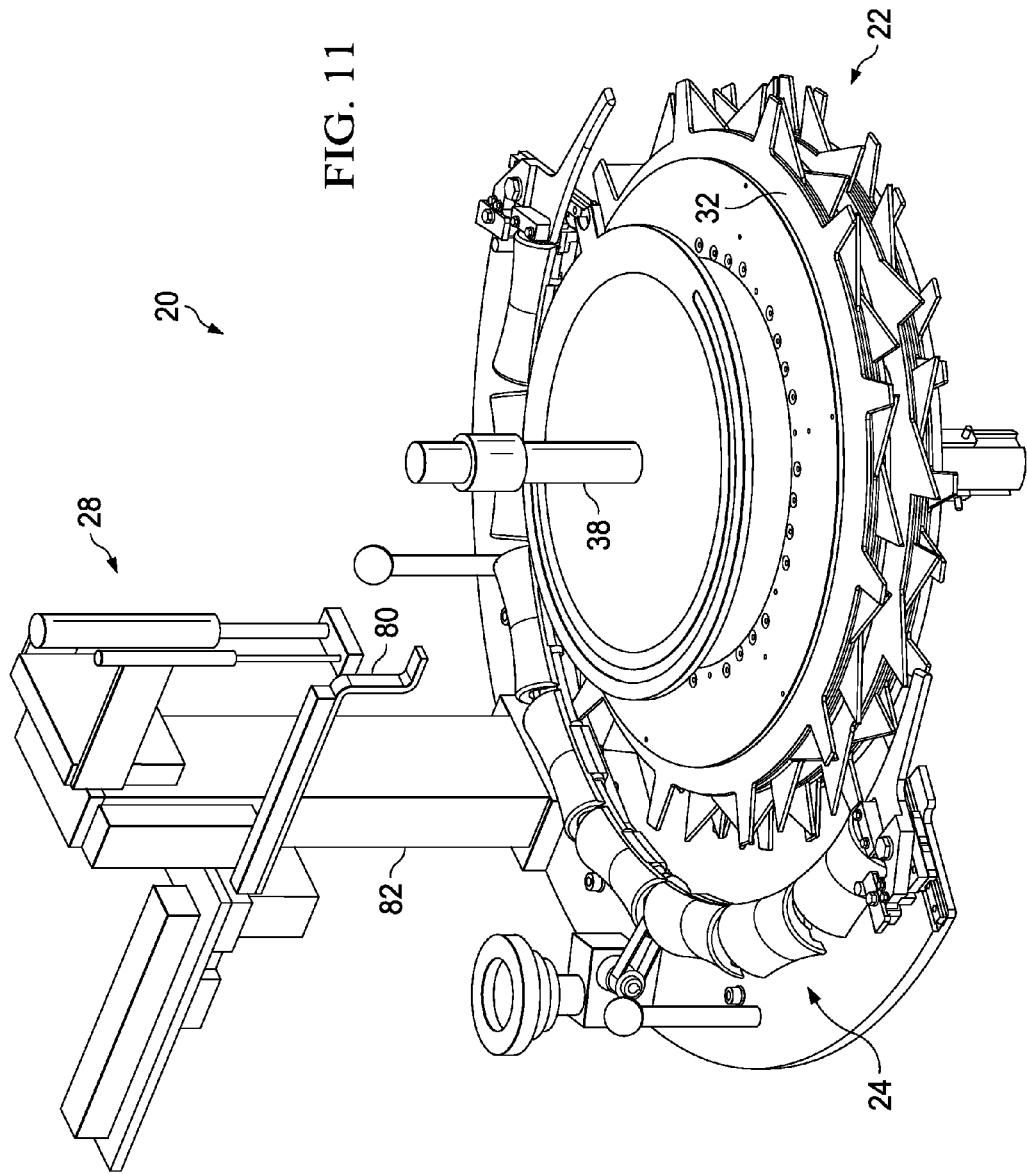
FIG. 11 is a perspective view of a star wheel having another alternative rotational adjustment mechanism.

The support 82 can have any suitable configuration. In some cases (as shown in FIG. 11), the support 82 may be in the form of a component such as a post or mast that is separate from other components of the star wheel system 20. In other cases, such as shown in FIGS. 1 and 2, and as described in greater detail below, the rotational adjustment mechanism 28 may utilize another component of the star wheel system 20 to provide the function of the support.

Figure 10:
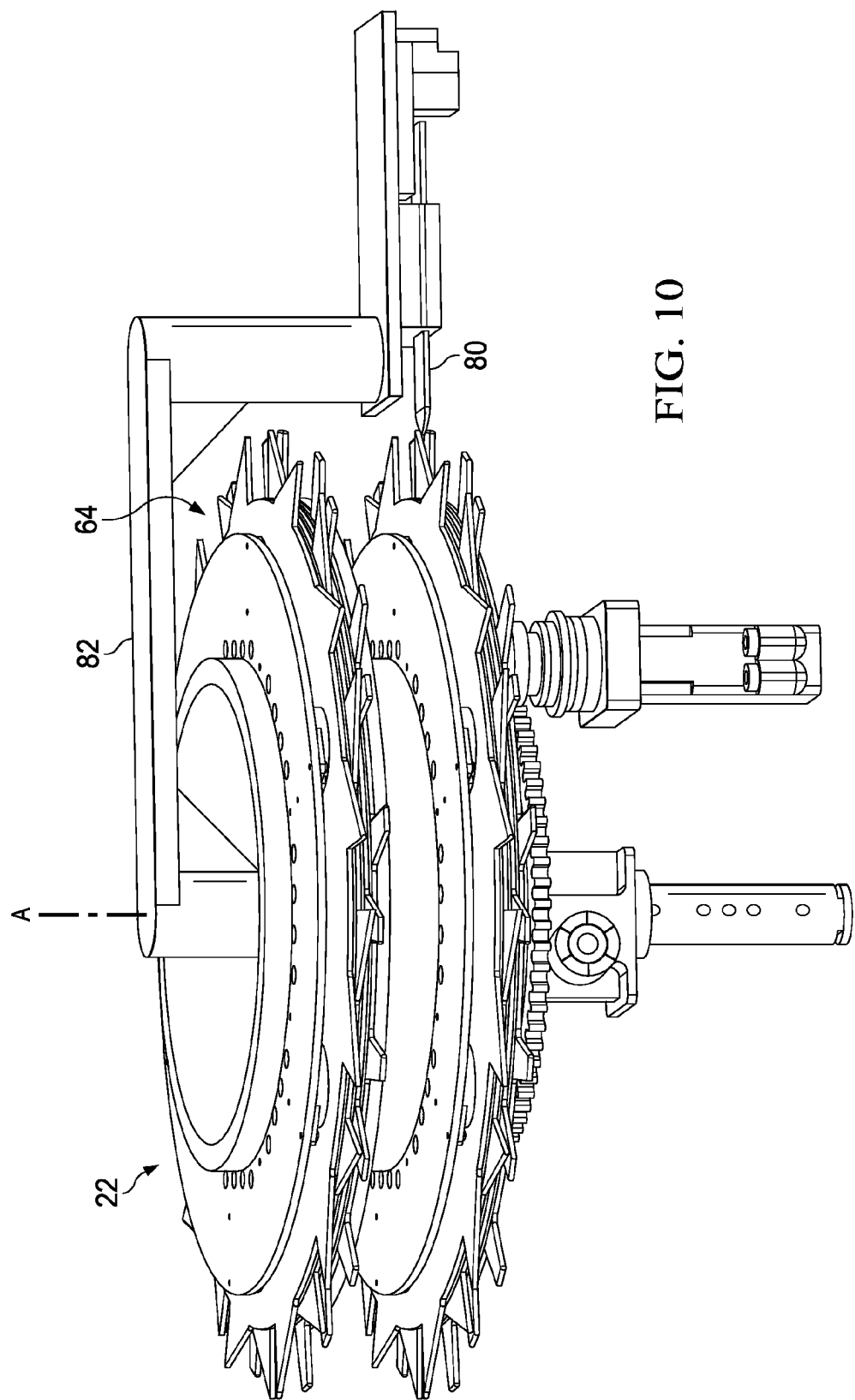
FIG. 10 is a perspective view of another star wheel having an alternative embodiment of a rotational adjustment mechanism.

The rotational adjustment mechanism 28 can be positioned at any suitable location relative to the star wheel 22. In some cases, such as shown in FIG. 10, the support 82 can be at least partially located inside the peripheries 64 of the rotatable elements 32 of the star wheel. For example, the support 82 can be located in the middle of the star wheel 22. In order to accommodate the support 82, the center shaft 36 of the star wheel 22 may be made hollow, and the support 82 may project upward from the center of the star wheel 22, and at least a portion of the support 82 and/or the adjustment element 80 may extend outward to reach the rotatable elements 32. Such an embodiment may be useful if there is insufficient space around the star wheel to locate the rotational adjustment mechanism 28 outside of the star wheel.

In other cases, at least a portion of the support 82 may be disposed radially outside or outward of at least portions of, or all of, the peripheries 64 of the rotatable elements 32. Such a rotational adjustment mechanism 28 may be thought of as being in the form of an external arm. The term "radially", as used herein, refers to directions that extend toward or away from the axis A. The term "radially inward" refers to a direction toward the axis A. The term "radially outward" refers to a direction away from axis A. For example, as shown in FIGS. 1 and 2, the support 82 may be located at a position that lies entirely outside (radially outward) of the peripheries 64 of the rotatable elements 32. The location of the support 82 and the adjustment element(s) 80 should be such that the rotatable elements 32 are free to rotate in order to convey the articles. Thus, these components (at least after the adjustment element(s) 80 retract, as described in greater detail herein), should be located outside of the area that is both at the same vertical elevation as the rotatable elements 32 and is within the peripheries 64 of the rotatable elements 32 and any space in the plane of the rotatable elements that is occupied by the articles 10 being conveyed, as well as any vertical space above or below the aforementioned area that is occupied by the articles 10.

The location of the support 82 often also needs to take into account the presence of the guide rail system 24. The guide rail system 24 is typically positioned along a portion of the periphery of the star wheel 22. The guide rail system 24 provides the adjustable star wheel conveyor 22 with a component to counter the centrifugal force that tends to make the articles 10 move out of the pockets 60 in the radially outward direction when the star wheel 22 rotates. Other types of components suitable for this purpose include, but are not limited to vacuum cups, and belts.

In some embodiments, the support 82 may be positioned along a portion of the periphery of the star wheel 22 that is on the opposite side of the star wheel 22 from the guide rail 24. For example, in some embodiments, the support 82 could be positioned at a location such as at the position designated by "X" in FIG. 1.

In other embodiments, the support 82 can be positioned far enough outward from the center of the star wheel 22 that at least a portion of the support 82 is positioned radially outward behind the guide rail system 24. This location of the support 82 has the advantage that the adjustment mechanism 28 can be positioned in nearly any location around the periphery of the star wheel without interfering with the guide rail system 24.

Figure 9:
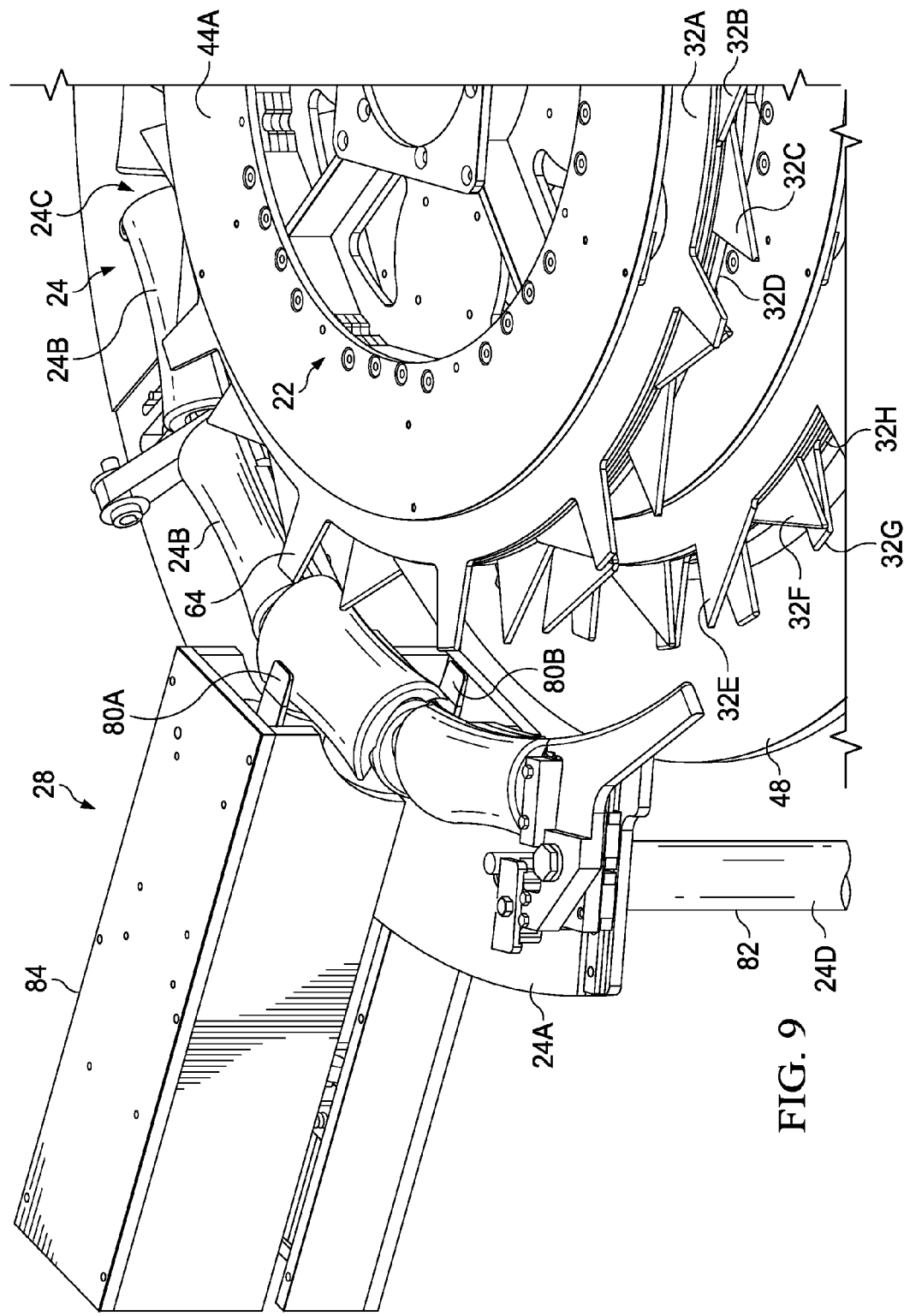
FIG. 9 is an enlarged perspective view of a portion of the adjustable star wheel system shown in FIG. 1.

In still other embodiments, as shown in FIGS. 1 and 9, the rotational adjustment mechanism 28 can be adjacent to the guide rail 24, or it can even be located on a portion of the guide rail system 24. If an adjustable guide rail 24 is used, it can be of any suitable type, and in any suitable configuration. The particular configuration of the guide rail 24 is not critical. FIGS. 1 and 9 show one non-limiting example of an adjustable guide rail system 24 to use with the star wheel 22. The guide rail shown in FIGS. 1 and 9 is of the type described in U.S. Pat. No. 8,499,921, Orndorff. Other suitable guide rails are described in U.S. Pat. No. 8,418,836, Papsdorf.

FIGS. 1 and 9 show an embodiment in which the adjustment elements 80A and 80B are mounted on a portion of the adjustable guide rail system 24. As shown in FIG. 9, in this particular embodiment, the adjustable guide rail system 24 comprises: a back guide plate 24A, a plurality of guide elements 24B that together comprise the guide rail 24C, and at least one guide rail support 24D that allows the guide rail 24C to be raised and lowered to accommodate articles of differing heights. As shown in FIG. 1, there are two guide rail supports 24D for evenly raising and lowering the back guide plate 24A and the guide rail 24C.

In the embodiment shown, the adjustment elements 80A and 80B are mounted on the back guide plate 24A of the adjustable guide rail system 24. The raising and lowering of the adjustable guide rail system 24, thus, also provides vertical adjustment for the rotational adjustment mechanism 28. In effect, the guide rail supports 24D also serve as the support 82 for the rotational adjustment mechanism 28. The guide rail supports 24D may comprise any suitable mechanism for raising and lowering the guide rail 24C. In one embodiment, the guide rail supports 24D are each provided with a mechanism in the form of a combination of a ball screw linear slide and motor 24E for raising and lowering the guide rail 24C.

The adjustment element(s) 80 may be movable so that they may be positioned to at least temporarily engage one or more of the rotatable elements, disks 32. The adjustment element(s) 80 may temporarily engage a rotatable element, or elements, in order to at least assist in adjusting the rotational position of the rotatable element(s) 32 and set at least part of the configuration of a pocket 60 for the articles 10 to be conveyed.

The adjustment element(s) 80 can engage any suitable portion of the rotatable elements 32 such as an adjustment zone on the rotatable element 32. The adjustment zone may include any suitable portion of the rotatable element 32 including, but not limited to: the side edge of the rotatable element; any existing protrusion 70 used to form a pocket for an article; a notch (not shown) that may be specifically put into (the side, top, or bottom of) the rotatable elements 32 for this purpose; or magnets joined to (for example, embedded in) the rotatable element. In the embodiment shown, the adjustment element(s) 80 contact a portion of the periphery 64 of the rotatable elements 32, such as the side edge of the rotatable elements, disks 32. This may comprise any of the following portions of the disks 32: the control surface 72, opposing side 74, or another suitable portion, on the side edge of the disks 32. In addition to the adjustment element 80 engaging the outer periphery of the rotatable element 32, it is also possible to configure the adjustment element 80 to engage an interior surface or feature of the rotatable element 32 in the proximity of the hole in the center of the disk 68.

The adjustment element(s) 80 can comprise any suitable type of element having any suitable configuration. In the embodiment shown, the adjustment element 80 is in the configuration of a finger. The finger may be in any suitable configuration, including but not limited to a substantially straight configuration as shown in FIGS. 1 and 2, or a bent configuration as shown in FIG. 11. The bent configuration provides the advantage that the adjustment mechanism 28 may be located radially outside the guide rail 24C, and the adjustment element 80 may reach over the guide rail 24C to contact the rotatable elements 32. The adjustment element 80 may be sized and configured to contact only a single rotatable element 32 at a given time. In other cases, the adjustment element 80 may be sized and configured to contact two or more rotatable elements 32 at a given time. In still other cases, as shown in FIG. 13, the adjustment mechanism 28 may comprise multiple adjustment elements 80, wherein each adjustment element 80 may be vertically positioned to engage a corresponding rotatable element 32 in the stack of rotatable elements.

The adjustment element(s) 80 may be movable relative to the support 82. The adjustment element(s) 80 may be in communication (e.g., mechanical and/or electrical communication) with a motive power source, such as a motor that provides power to move the adjustment element(s) 80 relative to the support 82. The adjustment element(s) 80 may be movably joined to the support 82 in any suitable manner. In the embodiment shown, the adjustment element(s) 80 are each joined to an air cylinder that can extend horizontally and retract. The air cylinder is of a conventional type and is not shown. In addition, the guide rail supports 24D with servo driven ball screw linear slides allow the adjustment element(s) 80 to travel vertically. As a result, the adjustment element(s) 80 can be precisely aligned with each rotatable element 32 for adjustment of the same to allow the star wheel 22 to be changed over to a new configuration.

Figure 12:
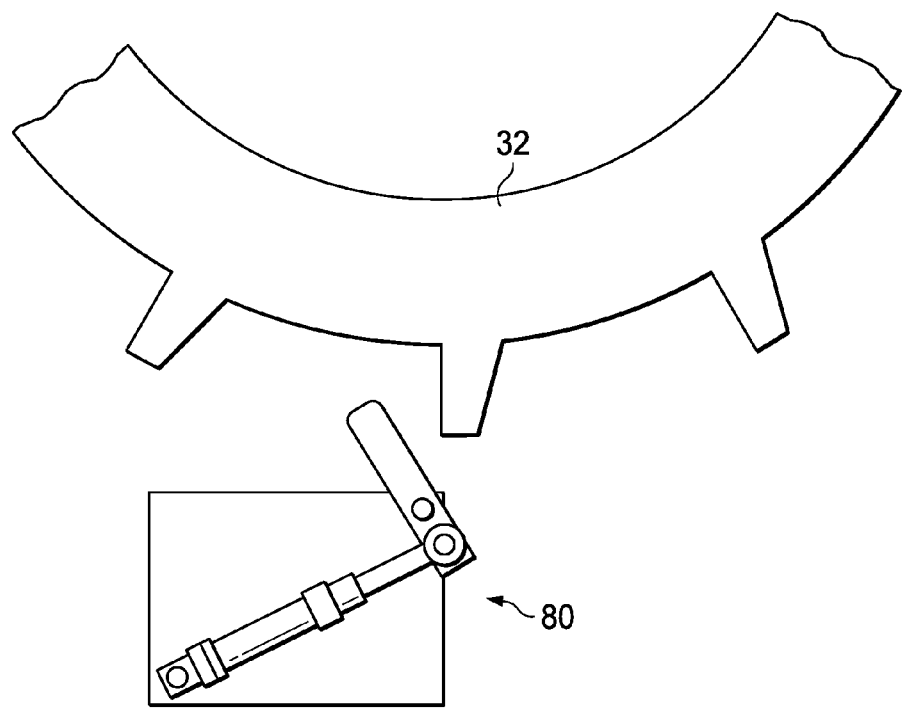
FIG. 12 is a fragmented perspective view showing still another alternative adjustment element in a first position.
Figure 12A:
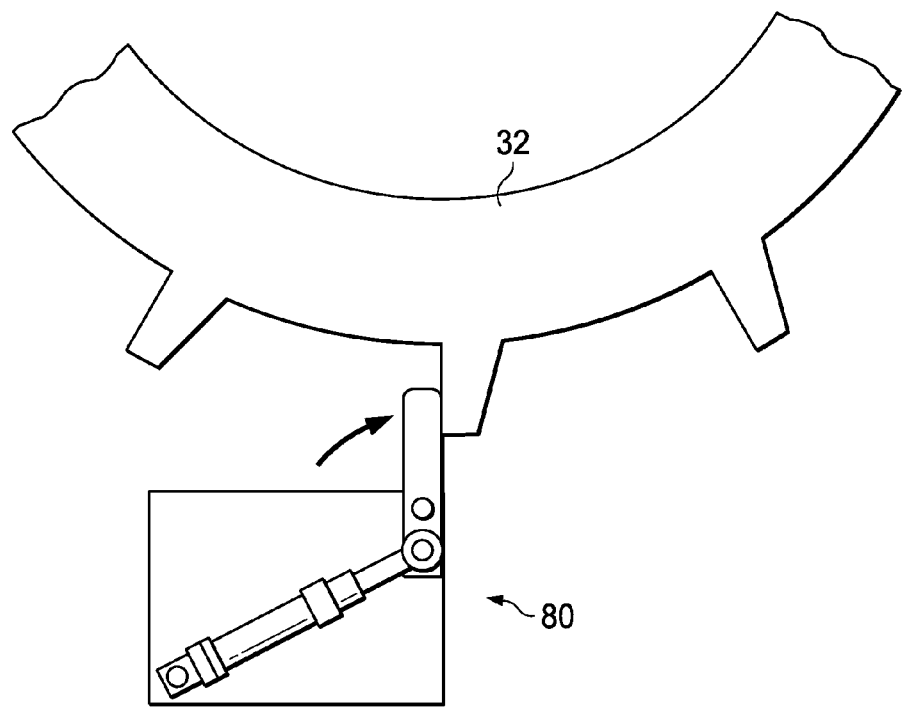
FIG. 12A is a fragmented perspective view showing the alternative adjustment element in FIG. 12 in a second position.

The adjustment element(s) 80 may, depending on the location of the rotational adjustment mechanism 28 relative to the star wheel 22, move in at least one of the following directions to engage at least one of the rotatable elements 32: upwardly, downwardly, inwardly, outwardly, laterally, or they may revolve relative to the axis A to engage at least one of the rotatable elements 32. The adjustment element(s) 80 may move inwardly and/or outwardly in the direction of the radius of the rotatable elements 32. It should be appreciated, however, that if the rotational adjustment mechanism 28 is located outside of the rotatable elements 32, when the adjustment element 80 moves radially inwardly toward the rotatable elements 32, from the point of reference of the rotational adjustment mechanism 28, the adjustment element 80 will be moving outward, or away from, the support 82. It should also be understood that the movement of the adjustment element(s) 80 is not limited to a direction that is exactly inwardly and/or outwardly in the direction of the radius of the rotatable elements 32. The adjustment element(s) 80 may move in a direction that is generally inwardly and/or generally outwardly relative to the axis A of the rotatable elements 32. Such movement can serve the purpose of adjusting the rotational position of the rotatable elements 32, even if the direction of movement is at an angle relative to the radius of the rotatable elements 32. In addition, the motion of the adjustment element(s) 80 may be any suitable type of motion. Suitable types of motion include, but are not limited to: translation (as in the embodiment shown in FIGS. 1 and 9); pivoting (as shown in FIGS. 12 and 12A); movement such as that in which the adjustment element 80 moves upward and/or downward in the recess 66 between the protrusions 70 of the rotatable element 32; revolution about axis A; and any other type of motion that can be used to adjust the rotational position of a rotatable element 32.

In the embodiment shown in FIGS. 1 and 9, the adjustment element(s) 80 move inwardly toward the rotatable elements to engage, or to be engaged by, the rotatable elements 32. Once the position of a rotatable element 32 is set, the adjustment element 80 retracts so that it is moved out of the way, and the rotatable elements 32 may rotate. Of course, as noted above, in alternative embodiments, the adjustment element(s) 80 can be configured so that moving the adjustment element(s) 80 outwardly and/or up or down may engage the adjustment element(s) 80 with the rotatable element(s) 32.

The rotational adjustment mechanism 28 can cooperate with the rotary device, such as the star wheel 22, to set the relative rotational position between the rotatable elements 32. In the embodiment shown, the support 82 is stationary, and the adjustment element(s) 80 are movable inwardly to engage the rotatable elements 32. The adjustment element(s) 80 may also be vertically movable along the support 82. To adjust the relative rotational position of an individual rotatable element 32 relative the other rotatable elements 32 and adjustable star wheel 22, the vertical elevation of the adjustment element 80 is adjusted to correspond with the vertical elevation of the rotatable element 32 to be adjusted. The adjustment element 80 is extended inwardly to engage the rotatable element 32. The adjustment element 80 may remain stationary relative to the rotation of shaft 36 and (the rotatable elements 32 of the) adjustable star wheel 22. With the locking mechanism 50 off, the shaft 36 and adjustable star wheel 22 are rotated by the motor 26. The rotatable element 32 to be adjusted that is engaged with adjustment element 80 does not rotate with the other elements of the star wheel 22 including the shaft 36, clutch plates 34, and the remainder of rotatable elements 32. This results in an adjustment of relative angular displacement of the individual rotatable element 32 being adjusted and the remainder of the rotatable elements 32. The relative motion between rotatable elements 32 is used to adjust the pockets 60. Engaging the locking mechanism 50 after adjustments prevents additional relative motion between the rotatable elements 32. Moving the adjustment element(s) 80 radially outward disengages the adjustable element 80 and rotatable element 32. This method can be repeated for each rotatable element 32 as needed to achieve the desired pocket geometry 60 to accommodate article 10.

The rotational adjustment system may, thus, comprise the rotational adjustment mechanism 28 and components of the rotary device that cooperate with the rotational adjustment mechanism 28 to set the rotational position of the rotatable element(s) 32. These components may include, but are not limited to the drive motor 26, the drive shaft 36, and the locking mechanism 50.

Numerous variations of the rotational adjustment system are possible. In other embodiments, rather than having an adjustment element 80 that remains stationary when in contact with the rotatable element 32 while the rotatable element 32 is rotated, the adjustment mechanism 28 can be configured so that it comprises a component that is movable relative to the rotary device, such as star wheel 22. For instance, the adjustment element 80 may be on a support that is configured to revolve around least a portion of the periphery of the star wheel 22 with relative motion in order to rotate the rotatable elements 32 to the desired position to form pockets 60 for the articles to be conveyed.

In another variation, the adjustment mechanism 28 may be movable relative to the rotatable element 32 to rotate the rotatable element 32, and the rotatable element (or stack of rotatable elements) can be rotated so that both are movable. In such a case, the adjustment element 80 and the rotatable element 32 may both move to contact (or otherwise engage) each other to set the position of a rotatable element 32. For example, the rotational adjustment mechanism 28 can revolve at least partially around the rotatable elements 32, and the rotatable element(s) 32 can rotate. When setting the position of the rotatable elements 32, the adjustment mechanism 28 may revolve in the same direction (that is, clockwise or counter-clockwise) as the rotation of the rotatable element(s) 32, or in the opposite direction. The rotational adjustment mechanism 28 may move at the same speed as the rotatable element(s) 32, or at a different speed.

The procedure for adjusting the configuration of the pockets 60 of the star wheel 22 using the rotational adjustment mechanism 28 shown in FIGS. 1 and 9 is as follows.

The first steps in order to set the boundaries of the pockets 60 are to determine the actual position of each rotatable element 32, and the desired rotational position of each rotatable element 32. It may, therefore, be desirable to sense or measure the relative position of the rotatable elements 32 prior to adjustment. The adjustment can then be based on the relative angle between rotatable elements 32 and the incremental adjustment needed to achieve the desired final rotational position for each rotatable element 32. Alternatively, all of the rotatable elements 32 may initially be moved to a "home" or starting position. Then absolute adjustments can be made to move the rotatable elements 32 to the desired positions.

Once the desired positions of the rotatable elements 32 are selected, and it is time to adjust the positions of the same, the locking mechanism 50 should initially be engaged to prevent relative motion between the rotatable elements 32. The adjustment element 80, if not already at the elevation of a first rotatable element 32, is brought to the elevation of a first rotatable element 32, such as first rotatable element 32A. In the embodiment shown, the adjustment element 80 is brought to the desired elevation by adjusting the elevation of the guide rail system 24.

The first rotatable element 32A is rotated to the angular position that will allow engagement with adjustment element 80A by rotating the components of the star wheel 22 with drive motor 26. The adjustment element 80A is then extended so that the adjustment element 80A engages with first rotatable element 32A. In the embodiment shown, the adjustment element 80A engages one of the control surfaces (for example, one of the straight edges) 72 of the first rotatable element 32A. With the first rotatable element 32A engaged with the adjustment element 80A, the first rotatable element 32A is prevented from rotation about axis A in either or both clockwise and counterclockwise directions. The locking mechanism 50 is next disengaged to allow relative motion between the rotatable elements 32. The drive motor 26 for the star wheel 22 is activated so that the entire assembly of rotatable elements 32 is rotated about the shaft 36 except for the first rotatable element 32A engaged by adjustment element 80A. The star wheel 22 is rotated to a rotational position that achieves the desired angular displacement of first rotatable element 32A relative to the other rotatable elements 32 to achieve desired pocket 60. The locking mechanism 50 is next engaged to prevent relative motion between the rotatable elements 32. The adjustment element 80A is then retracted.

The adjustment element 80A is then raised (or lowered) to the level of a second rotatable element 32, such as second rotatable element 32B. The second rotatable element 32 is rotated to the angular position that will allow engagement with adjustment element 80 by rotating the star wheel 22 with drive motor 26. The upper adjustment element 80A is extended to engage with second rotatable element 32B. The locking mechanism 50 is next disengaged to allow relative motion between the rotatable elements 32. The drive motor 26 for the star wheel 22 is activated so that the entire assembly of rotatable elements 32 is rotated about the shaft 36 except for the second rotatable element 32B engaged by adjustment element 80A. The star wheel 22 is rotated to a rotational position that achieves the desired angular displacement of second rotatable element 32B relative to the other rotatable elements 32 to achieve desired pocket 60. The locking mechanism 50 is next engaged to prevent relative motion between the rotatable elements 32. The adjustment element 80A is then retracted.

The rotation of the rotatable elements 32 of the star wheel 22 that are not engaged by adjustment element 80A while adjusting the second rotatable element 32B also includes rotating the first rotatable element 32A, whose rotational position was previously set. In this case, friction between the first rotatable element 32A and adjacent clutch plate 34 directly under the first rotatable element 32A prevents the first rotatable element 32A from rotating relative to the star wheel 22 when the locking mechanism 50 is disengaged. It may be desirable to select materials for the clutch plate 34 that have medium to high coefficients of friction at the interface between the clutch plate 34 and first rotatable element 32A to prevent unwanted relative motion due to vibration. A coefficient of friction greater than 0.1 is recommended. It also may be beneficial to increase the normal force between the clutch plate 34 and first rotatable element 32A (as well as between the other rotatable elements and clutch plates) and corresponding frictional torque by employing springs, magnets, air bladders, etc.

The adjustment element 80 can engage with the rotatable element 32 to be adjusted in a number of ways. The adjustment element 80 can be a projection that plugs into a corresponding pocket on the rotatable element 32. Once the adjustment element 80 projection is engaged with the mating pocket on the rotatable element 32, the rotatable element 32 is prevented from rotation in either the clockwise or counterclockwise direction by the adjustment element 80. Alternatively, the end of the adjustment element 80 can incorporate a pocket that mates to a corresponding projection on the rotatable element 32. Once the adjustment element 80 pocket is engaged with the mating projection on the rotatable element 32, the rotatable element 32 is prevented from rotation in either the clockwise or counterclockwise direction by the adjustment element 80. Alternatively the adjustment element 80 can be a projection that contacts a single surface of the rotatable element 32 such as control surface 72 or side of element 74. In this embodiment, once the adjustment element 80 pocket is engaged with the mating control surface 72 on the rotatable element 32, the rotatable element 32 is prevented from rotation in only one direction (clockwise or counter-clockwise direction) by the adjustment element 80. This is desirable because it is possible to extend the adjustment element 80 out anywhere within the recess 66 in the rotatable element 32 without precise rotational alignment to the control surface 72. As the star wheel 22 is rotated to initiate adjustment, the rotatable element 32 will rotate with the star wheel 22 until the control surface 22 makes contact with the adjustment element 80. As the star wheel 22 continues to rotate in the previous direction, the adjustment element in contact with the control surface 72 will prevent further rotation of rotatable element 32 which will result in angular adjustment relative to the star wheel 22.

The rotational positions of the rotatable elements 32 are, thus, set by the adjustment element(s) 80. However, once the rotational position of a rotatable element 32 has been set (such as the first rotatable element 32A) there is no need for the adjusted rotatable element to remain with their control surface 72 aligned with the adjustment element 80. This is because the rotational positions of the remaining rotatable elements 32 are set relative to the rotational position of the prior rotatable elements 32 that have been previously adjusted. For example, adjustment element 80A engages the control surface 72A of the first rotatable element 32A and sets the rotational position of the first rotatable element 32A at a rotational position relative to the star wheel 22 and the remainder of the rotatable elements 32. Next the rotatable elements 32 of the star wheel 22 are rotated as a unit until the control surface 72B of the second rotatable element 32B engages the adjustment element 80A and the second rotatable element 32B is adjusted relative to the star wheel 22 and the remainder of the rotatable elements 32. While the second rotatable element 32B is being adjusted, the control surface 72A of the first rotatable element 32A rotates with the star wheel 22 relative to adjustment element 80A.

The main drive motor 26 for rotating the star wheel, thus, is also partially responsible for adjusting relative angles of the star wheel plates, and comprises a part of the overall rotational adjustment system. The term "relative angle", as used herein, is the angle formed between a line extending along the radius of one rotatable element 32 through a given point on that rotatable element (such as the location where the adjustment element engages the rotatable element) and a similar line drawn on another rotatable element. The relative angle between rotatable elements 32 is adjusted to accommodate a different article when the drive motor 26 applies torque to a selected rotatable element or elements to cause relative motion and displacement between the rotatable elements 32. The adjustment element 80 prevents rotation of a selected rotatable element 32 while the drive motor 26 applies torque to remaining rotatable elements resulting in relative motion and displacement between the selected rotatable element 32 and the remaining unit of rotatable elements. The sequence is repeated until all eight rotatable elements 32 have been moved as necessary and the new pocket 60 configuration has been formed.

In the procedure set out above, the first rotatable element 32 selected may be any suitable disk, and need not be the first rotatable element 32A. For example, one or more of the disks, such as disk 32H, may be fixed to the shaft 36 so that setting its rotational position is not required. In such a case, the rotational position of the other disks 32 may be set relative to the position of eighth disk 32H. Of course, in other embodiments, the adjustment element(s) 80 can engage the disks 32 in any desired sequence, or simultaneously. For example, two or more adjustment elements 80 may be extended so that one adjustment element (such as the upper adjustment element 80A) contacts one disk 32, and another adjustment element (such as the lower adjustment element 80B) contacts another disk 32 to set the position of disks in the upper and lower assemblies 40 and 42 at the same time. Of course, the rotational positions may be different for the disks in the upper and lower assemblies 40 and 42.

The disks 32 in one, or both, of the assemblies 40 and 42 are then locked into their final position. Any suitable mechanism can be used to lock the disks into their final position. The locking mechanism 50 may, for example, apply force on the stack of rotatable elements 32, such as in a direction perpendicular to the surfaces of the rotatable elements 32. In the embodiment shown, air cylinders are used. More specifically, two or more pancake air cylinders 50 are located between the upper plates 44A and 46A and the stack of rotatable elements in each of the assemblies 40 and 42. In this case, an optional rotary union 96 used to provide a connection for hoses for supplying air to the air cylinders 50 may be joined to the shaft 36. When air is supplied to the air cylinders 50, the air cylinders expand to lock the disks 32 in position. One alternative configuration is to maintain axial clamping force between rotatable elements 32 and clutch plates 34 using compression springs. A pneumatic or hydraulic actuator is used to overcome the normal force generated by the springs and disengage the locking mechanism 50. Thus, when no external pneumatic or hydraulic force is applied, the locking mechanism 50 will be in its engaged or locked state which will prevent relative motion in the case of an air leak or lost air pressure. In addition to creating axial compressive force for locking with air cylinders, force can alternatively be generated with springs, hydraulic cylinders, air bags, magnets, electro-magnets, etc.

It may optionally be desirable to sense or measure the relative position of the rotatable elements 32 following the adjustment. This can be used to confirm that adjustments of the rotatable elements 32 were made within a desired tolerance for accuracy. It also is possible to sense or measure the relative position of the rotatable elements 32 during operation while conveying articles 10 or at any time after the adjustment was made. If the relative position of the rotatable elements 32 is sensed or measured real time while conveying articles 10, it can be possible to detect an undesired relative movement between the rotatable elements 32 that might be the result of a jam or equipment failure. In this case the conveying equipment can be stopped or the operator can be alerted. In any of these situations, if the relative positions of the rotatable elements 32 are not within a desired tolerance, the operator can be alerted or corrective actions can be automatically taken by repeating some or all of the adjustment procedure.

Once the pockets 60 are formed, and articles 10 are fed into the star wheel 22, the drive motor 26 applies torque and rotates all of the disks 32 in unison to transport the articles 10.

The rotational adjustment system described herein may provide a number of advantages. If there are a number of star wheel conveyors used on a machine, each of which requires that the disks be changed to accommodate different articles, it can take up to twenty minutes or more for an operator to move around the machine and adjust all the star wheels. Further, on some machines, the star wheels may be situated where they are difficult to access in order to change their configuration.

The rotational adjustment system may provide advantages over systems that utilize separate servo motors that are used to set the position of each of the disks. In addition to eliminating the need for multiple motors with one motor on each disk, this option also eliminates the need for components to commutate power and control to each of the motors. For example, there is no need for a slip ring with this design as the motor is not mounted to the rotating star wheel assembly. The rotational adjustment system uses the main drive motor 26 that already exists on the star wheel 22 to help with the changeover or adjustment from one size and/or shape article to another. Using an existing servo motor is a significant cost savings and a reduction in complexity. If every star wheel 22 in a given manufacturing or packing line is driven by its own servo motor, each rotatable element 32 can be independently and precisely rotated to whatever position is needed.

Elevation Adjustment System

The rotary device can also be provided with an elevation adjustment system to adjust the elevation of (that is, the displacement of) at least one rotatable element of the rotary device in a direction parallel to the axis about which the rotatable element rotates. The elevation adjustment system can be used for any type of rotatable element on a rotary device, such as a filler, capper, labeler, or star wheel conveyor to accommodate different size articles. For example, in the case of a star wheel 22, the elevation adjustment system can be used to adjust the vertical distance between at least two of the rotatable elements 32 in order to accommodate taller or shorter articles 10.

The elevation adjustment system may comprise an elevation adjustment mechanism 30 (or "elevation change mechanism"). The elevation adjustment mechanism 30 can be an optional feature that is also used on a star wheel 22 along with the rotational adjustment mechanism 28 that adjusts the configuration of the pockets 60. In other cases, the star wheel 22 or other rotary device may be only provided with an elevation adjustment mechanism 30 without providing it with the previously described rotational adjustment mechanism 28. In the latter cases, a star wheel 22 may utilize any known mechanism for adjusting the configuration of the pockets (provided that they are compatible with the elevation adjustment mechanism, however, often they are not).

In the case of a star wheel 22, the elevation adjustment mechanism 30 can be configured to adjust the distance between any two or more individual rotatable elements 32, or any two or more groups of rotatable elements 32 in a direction parallel to axis A. The elevation adjustment mechanism 30 can be configured to move one rotatable element 32 (or group of rotatable elements) while the other rotatable elements, or groups of rotatable elements, remain stationary. In other embodiments, the elevation adjustment mechanism 30 can be configured to adjust the distance between rotatable elements 32 in the direction of the axis A, by moving both rotatable elements, or groups of rotatable elements relative to each other. In the example star wheel 22 shown in FIG. 1, the elevation of the upper assembly 40 is changed by the elevation adjustment mechanism 30 while the lower assembly 42 remains stationary. The upper assembly 40 can be moved any suitable distance. In one case, the upper assembly 40 can move any suitable distance vertically from greater than 0 mm up to about 350 mm, or more.

The elevation adjustment mechanism 30 can comprise one or more components. The following types of mechanisms that may comprise at least one component of the elevation adjustment mechanism 30 include, but are not limited to: ball screw linear actuators; screw mechanisms; piston mechanisms, linear drive mechanisms, rack and pinion systems, spring systems, or cable/pulley systems.

Figure 15:
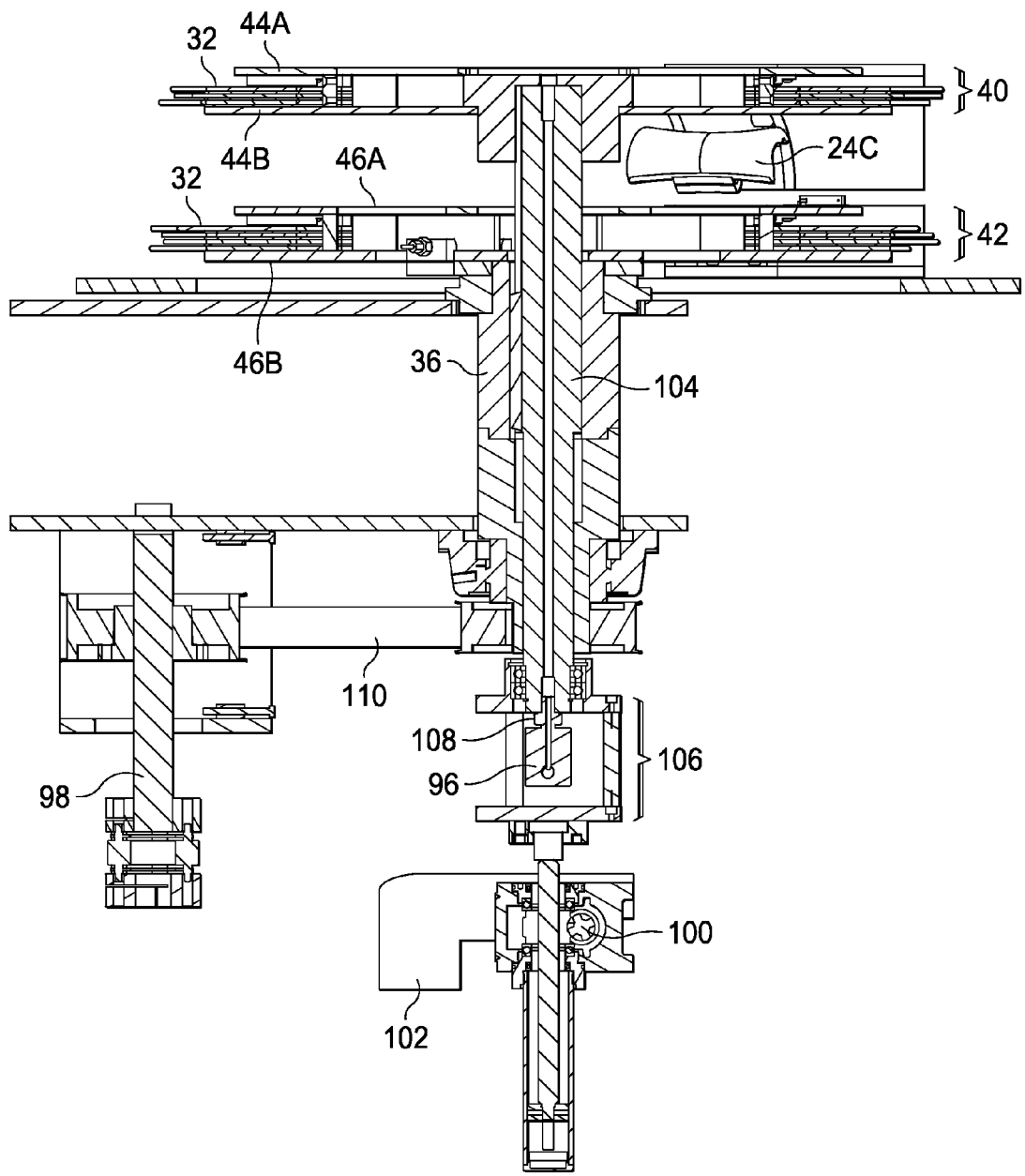
FIG. 15 is a cross-sectional view of the star wheel taken along line 15-15 of FIG. 1.

In the embodiment shown in FIG. 1, the elevation adjustment mechanism 30 comprises: a ball screw linear actuator (or simply "ball screw") 100; a motor, such as a servo motor (or "elevation servo motor") 102; and a shaft, such as an inner shaft 104. The ball screw linear actuator 100 is mechanically coupled to the elevation servo motor 102. In this embodiment as shown in FIG. 15, the star wheel drive shaft 36 comprises a hollow (e.g., cylindrical) tube with a large enough diameter that the inner shaft 104 is able to fit inside (in the interior 38) the drive shaft 36. The ball screw 100 is joined to the inner shaft 104.

As shown in FIG. 15, the ball screw 100 is joined to the lower end of the inner shaft 104 through an optional rotary union section piece 106 that contains the rotary union 96. The rotary union section piece 106 comprises two spaced apart horizontal plates that are joined by vertical rods. A rotatable connecting element 108 is positioned between the rotary union 96 and the upper horizontal plate. The rotatable connecting element 108 is rotatable, but the rotary union 96 is not. Air hoses can be connected to the rotary union 96 to supply air from the rotary union to the pancake air cylinders 50. The upper end of the inner shaft 104 is joined to the upper assembly 40. The inner shaft 104 can be joined to the drive shaft 36, so that when the final position of all the rotatable elements 32 is set, and it is desired to rotate the star wheel 22 to convey the articles, the upper assembly 40 will also rotate.

Figure 16:
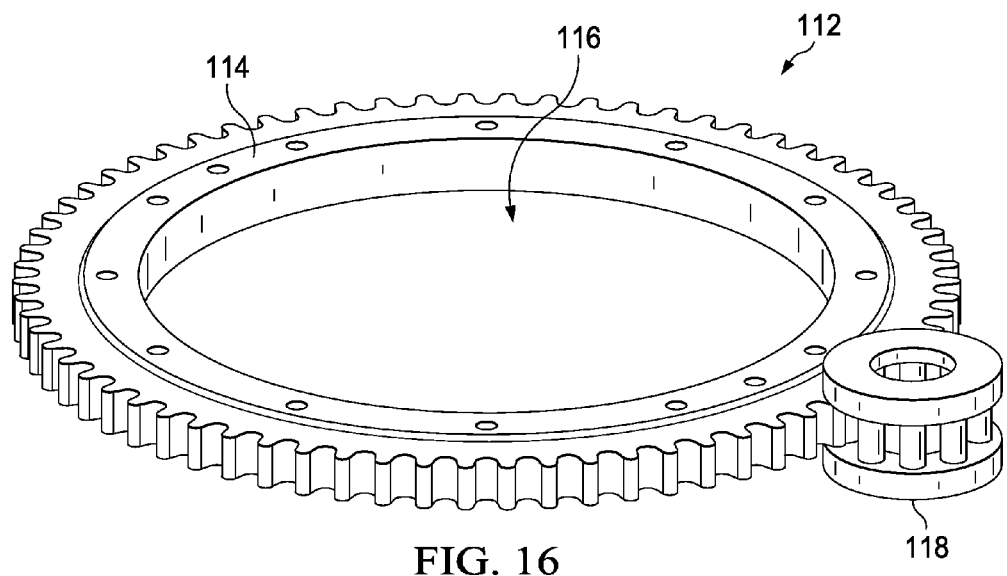
FIG. 16 is a perspective view of gear system suitable for linking the drive motor to the drive shaft.

Although many different arrangements for the components of the elevation adjustment system are possible, in this case, the main drive motor 26 and gear box for the star wheel 22 may be offset laterally from the axis A of the drive shaft 36. The main drive motor 26 may have an output shaft 98 that is parallel to the drive shaft 36. The output shaft 98 of the main drive motor 26 may be coupled to the drive shaft 36 by any suitable linking device, such as by a belt 110. One example of an alternative to the belt is a gear system such as the roller pinion gear system 112 shown in FIG. 16. Such a roller pinion gear system is available from Nexen Group, Inc. of Vadnais Heights, Minn., U.S.A. In this case, the drive shaft 36 will pass through the hole 116 in the center of the roller gear 114 and the roller gear 114 is joined to the drive shaft 36. The pinion gear 118 is joined to the shaft 98 of the main drive motor 26. Regardless of whether a belt or gear system is used, the offset arrangement allows the elevation servo motor 102 and the inner shaft 104 to be in alignment with each other, and in alignment with the axis A about which the rotatable elements 32 rotate.

In other embodiments, the main drive motor 26 need not be offset relative to the axis A about which the rotatable elements rotate. In such other embodiments, the main drive motor 26 may be in alignment with the axis A about which the rotatable elements 32 rotate, and the elevation servo motor 102 may be laterally offset relative to the axis A about which the rotatable elements 32 rotate. In still other embodiments, rather than having the elevation adjustment made by an inner shaft the elevation mechanism can be actuated by an outer concentric tube. For example, the rotary device can use a direct drive shaft located inside the outer concentric tube that has one end portion that is directly coupled to the drive motor 26 at the bottom and another end portion that is joined to the top of the star wheel.

The elevation adjustment system can operate as follows. If it is desired to make an elevation adjustment, a signal may be sent by a computer to the elevation servo motor 102. The signal tells the motor 102 to start which turns the ball screw 100. The linear motion of the ball screw 100 pushes the rotary union section piece 106 up or down, which causes the inner shaft 104 to slide up or down inside the shaft 36. This raises or lowers the upper assembly 40. In this embodiment, the drive shaft 36 only rotates, and does not move up and down. The ball screw 100 and the rotary union section piece 106 will not rotate when the shaft 36 rotates. The upper assembly 40 will, however, rotate as a unit with the lower assembly 42 when the drive shaft 36 rotates. When the desired elevation of the upper assembly 40 is reached, the elevation servo motor 102 can be shut off. This locks the elevation of the upper assembly 40.

Since the ball screw 100 will typically not reverse, or "back drive", no separate mechanism is needed to lock the upper assembly 40 in position. If this is not the case, an optional motor break may be applied.

Since the pitch of the ball screw mechanism 100 can be relatively fine, the ball screw 100 and elevation servo motor 102 provide the ability to make a virtually infinite number of fine elevation adjustments to the upper assembly 40. By using the elevation servo motor 102 to turn the ball screw 100, it is also possible to track how many rotations the elevation servo motor 102 makes, and know what the elevation change is for every revolution of the ball screw 100. As a result, the elevation of the upper assembly 40 can be determined using only feedback from the elevation servo motor 102. If desired, it is also possible to return the upper assembly 40 to a "home" position. This allows the star wheel system 20 to have the same starting point for tracking the elevation, even if the power is turned off or the unit is disassembled and put back together in a slightly different position.

FIGS. 17-21 show another example of an elevation adjustment mechanism 30. In this case, the elevation change is accomplished with an internal screw mechanism 120 shown in FIGS. 19 and 21. As in the case of the ball screw system described above, an internal screw mechanism 120 can be used when the drive shaft 36 is in the form of a hollow tube, and there is space for the internal screw mechanism 120 to fit in the interior 38 of the drive shaft 36. In this case, the internal screw mechanism 120 is driven by the main drive motor 26, rather than by a separate motor. The upper assembly 40 is mounted onto the internal screw 120, and as the screw 120 is turned in one direction, the upper assembly 40 is pushed upward. When the screw 120 is turned in the opposite direction, the upper assembly 40 is brought downward. This system can be constructed so that the upper assembly 40 does not rotate relative to the lower assembly 42 because it is locked in place with two or more internal gibs (plates that hold other parts in place). The gibs allow the upper assembly 40 to slide vertically relative to the lower assembly 42, but do not allow rotation. The screw mechanism, like the ball screw mechanism in the prior embodiment provides for virtually infinite adjustability of the elevation along its length.

Figure 17:
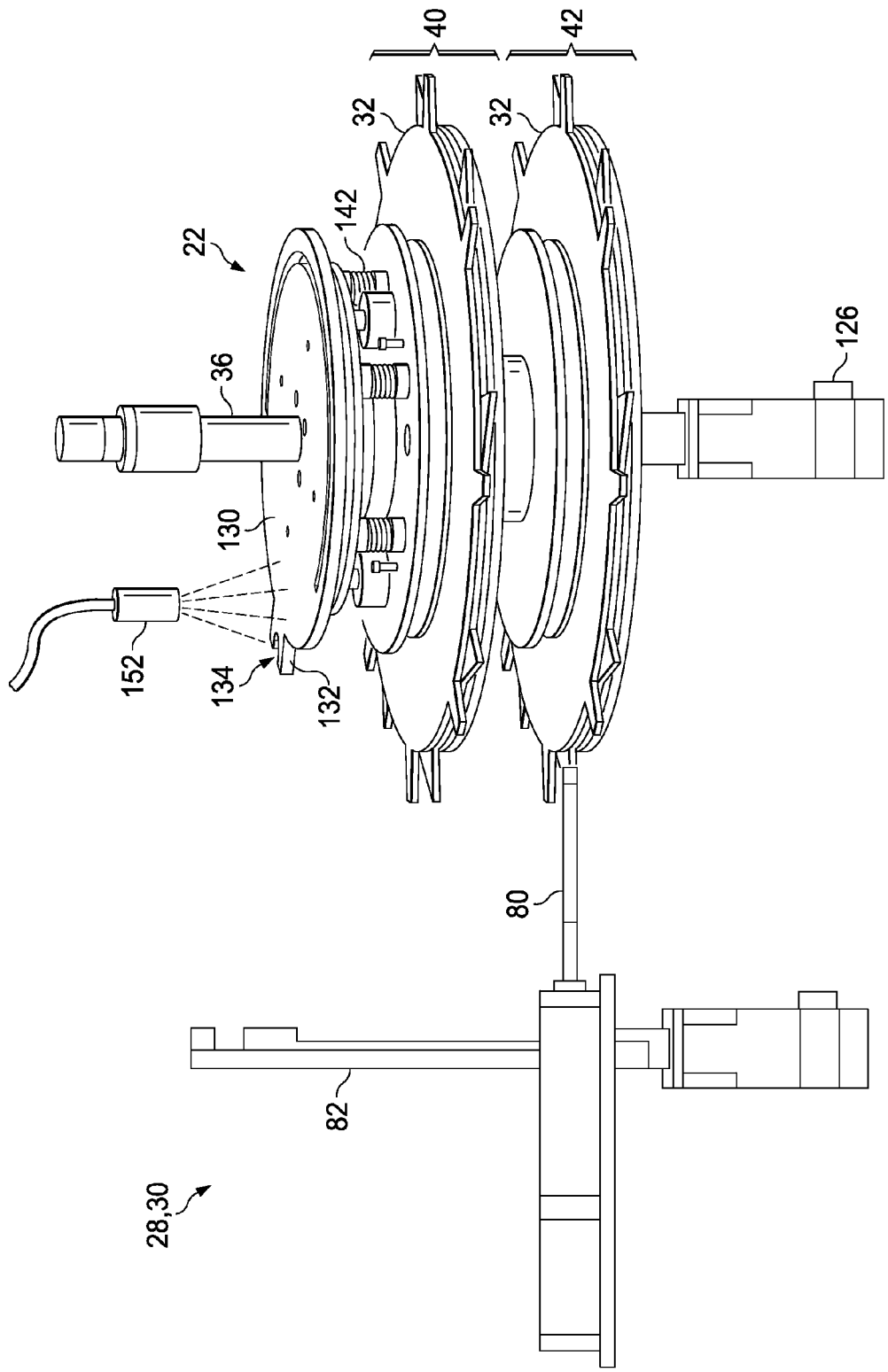
FIG. 17 is a perspective view of a star wheel having alternative types of rotational adjustment and elevation adjustment systems.
Figure 18:
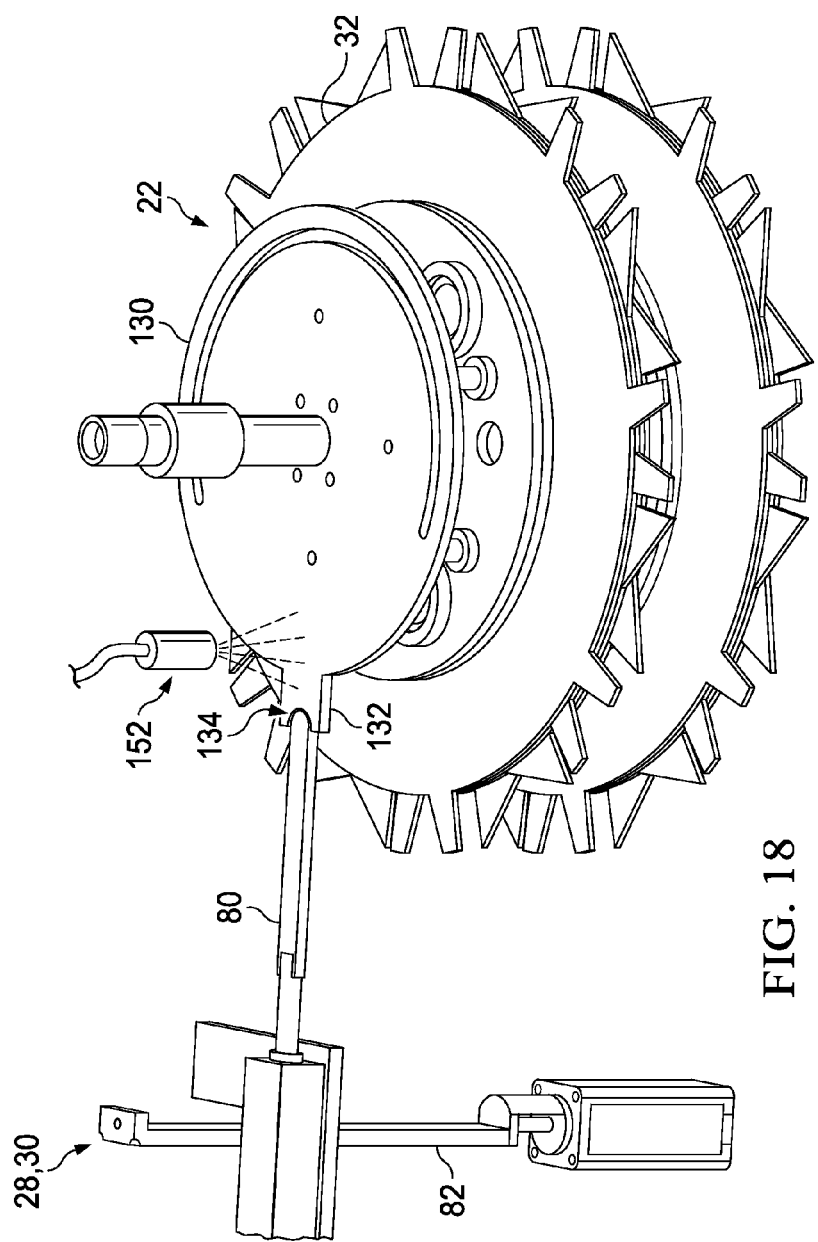
FIG. 18 is another perspective view of the star wheel shown in FIG. 17 showing the adjustment element engaging with an elevation adjustment initiation component.
Figure 19:
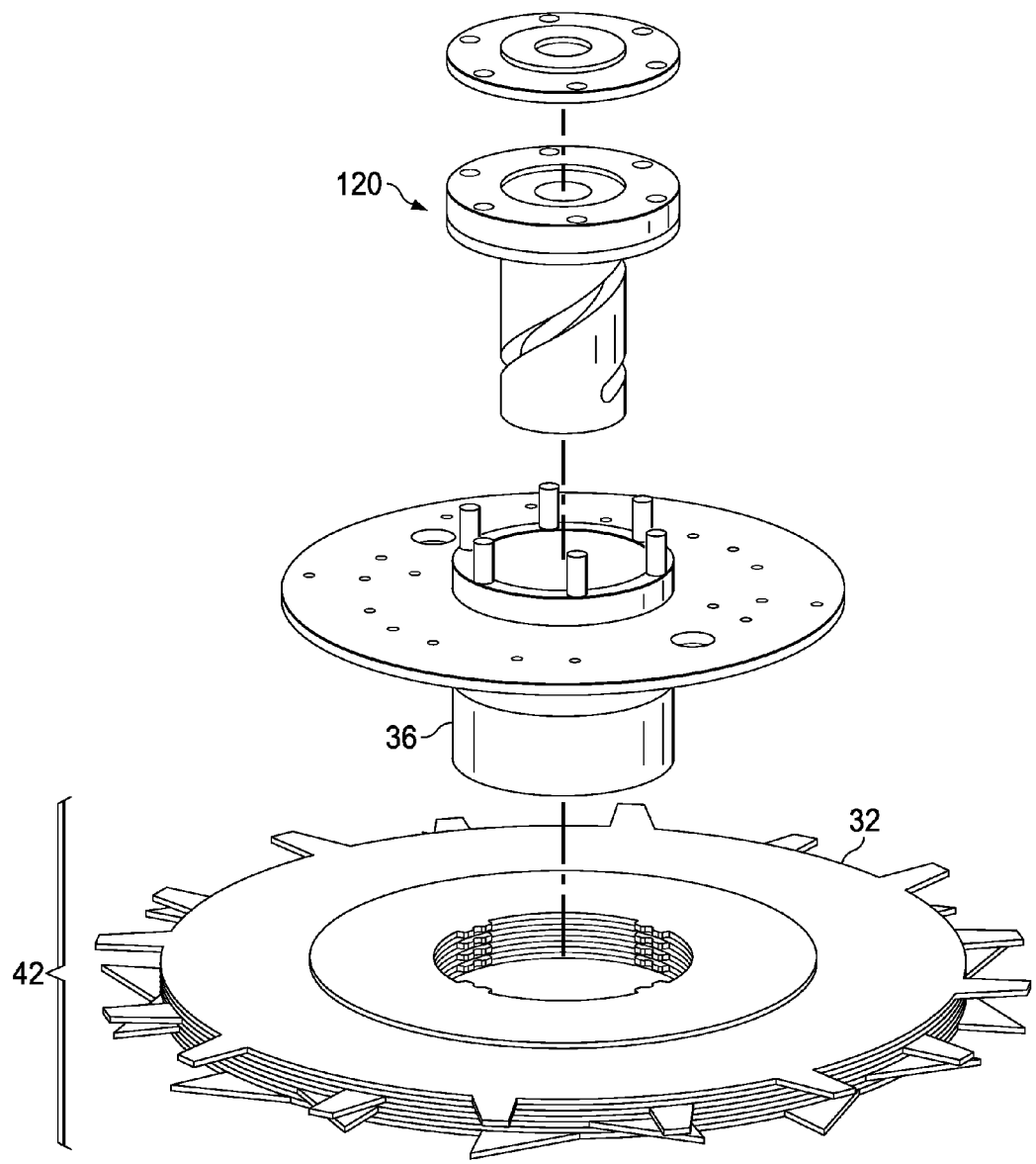
FIG. 19 is an exploded perspective view showing one portion of the internal screw mechanism of the star wheel shown in FIG. 17.

FIGS. 17-18 show that the elevation adjustment process may be controlled with an external component and an elevation locking system. The term "external component" refers to a component at least a portion of which is located outside of the exterior of the drive shaft 36.

Figure 21:
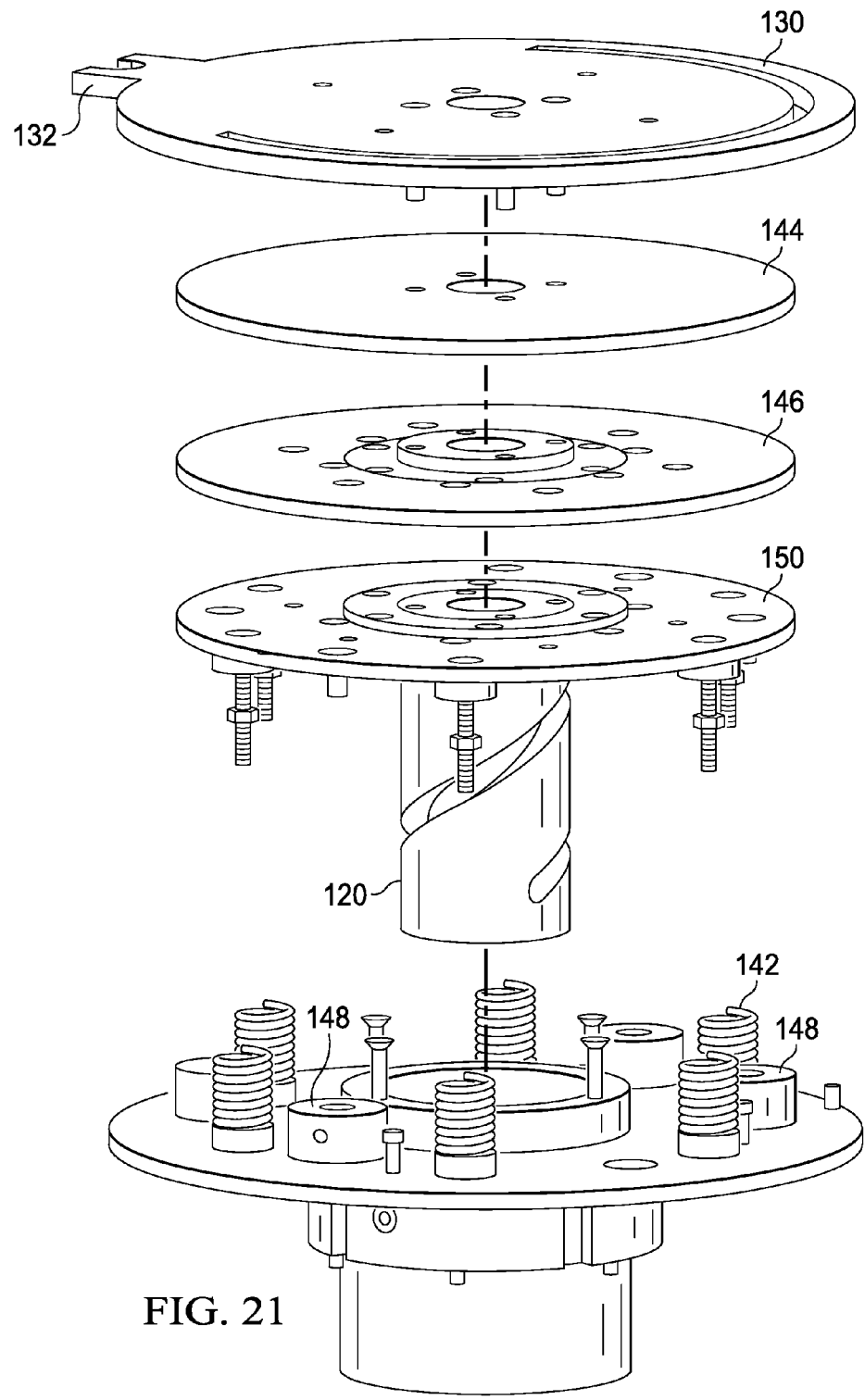
FIG. 21 is an exploded perspective view showing another portion of the internal screw mechanism and locking mechanism of the star wheel shown in FIG. 17.

The elevation adjustment system 30 can comprise one or more elements that initiate the elevation adjustment process. The element(s) that initiate the elevation adjustment process can have any suitable configuration. FIGS. 17, 18, and 21 show one non-limiting example of such an element is an elevation adjustment initiation component, which is in the form of a rotatable "skillet plate" 130 having a "skillet handle" 132. The skillet handle 132 extends radially outward from the body of the skillet plate 130. The distal end of the skillet handle 132 has a recess 134 therein for engaging an adjustment element 80. The upper assembly 40 of rotatable elements 32 in this example is joined to the skillet plate 130. The elevation initiation component, skillet plate 130, cooperates with the external component to initiate the elevation change process by unlocking the elevation locking system.

In the embodiment shown, the external component of the elevation adjustment mechanism 30 may comprise a mechanism that is similar to, or the same as the rotational adjustment mechanism 28 for setting the size of the pockets. In certain cases, the rotational adjustment system 28 and the elevation change system 30 can utilize some of the same components. The elevation adjustment system may, thus comprise a support 82 and an adjustment element 80. In other cases, any of such components of the elevation adjustment system 30 could be different from those of the rotational adjustment system 28. The benefit of using the same adjustment mechanism to initiate changing the elevation of the rotatable elements 32 that is used to change the rotational orientation of the rotatable elements 32 is to reduce the number of components (to eliminate the need to have separate adjustment elements, separate motors, etc.). However, in other cases, the elevation change could easily be accomplished with a separate mechanism comprising a separate motor, air cylinder, hydraulic ram, etc., that does nothing but change elevation. This device could be mounted on the rotary device, or it might be mounted off the rotary device. The elevation adjustment mechanism 30 could comprise a single radially actuated pneumatic cylinder that can extend adjustment element 80 at a fixed elevation to initiate the elevation adjustment. In this system, the only driving motor would be the main drive motor 26.

It may be desirable for an elevation locking system to be used with the elevation adjustment system comprising the internal screw mechanism 120 shown in FIGS. 17-21. Since the main drive motor 26 is also used to make the elevation adjustment, it may be necessary to disengage (or uncouple) the upper assembly 40 from the drive motor 26 in order to make the elevation adjustment. In such a case, after the upper assembly 40 is disengaged from the drive motor 26, the upper assembly 40 is moved to the desired elevation using the internal screw mechanism 120. The upper assembly 40 is then locked in position and re-coupled to the drive motor 26. The elevation locking mechanism may also be useful with any elevation adjustment mechanisms 30 that (unlike the ball screw embodiment described previously) do not have the ability to unlock and lock the elevation of the rotatable elements 32.

The elevation locking mechanism can be any suitable mechanism. The elevation locking mechanism may perform one or more of the following functions: uncoupling or unlocking the rotatable elements 32 to allow elevational adjustment, and fixing or locking their position after elevational adjustment. The elevation change mechanism may, thus, be selectively engageable with the mechanism for rotating the rotatable element. Suitable elevation locking mechanisms include, but are not limited to: spring clutches, ratchet systems, magnetic clutches, hydraulic pistons, and air cylinders. In those cases in which the elevation locking mechanism involves a type of clutch, the elevation locking mechanism may be referred to as an "elevation clutch".

Figure 20:
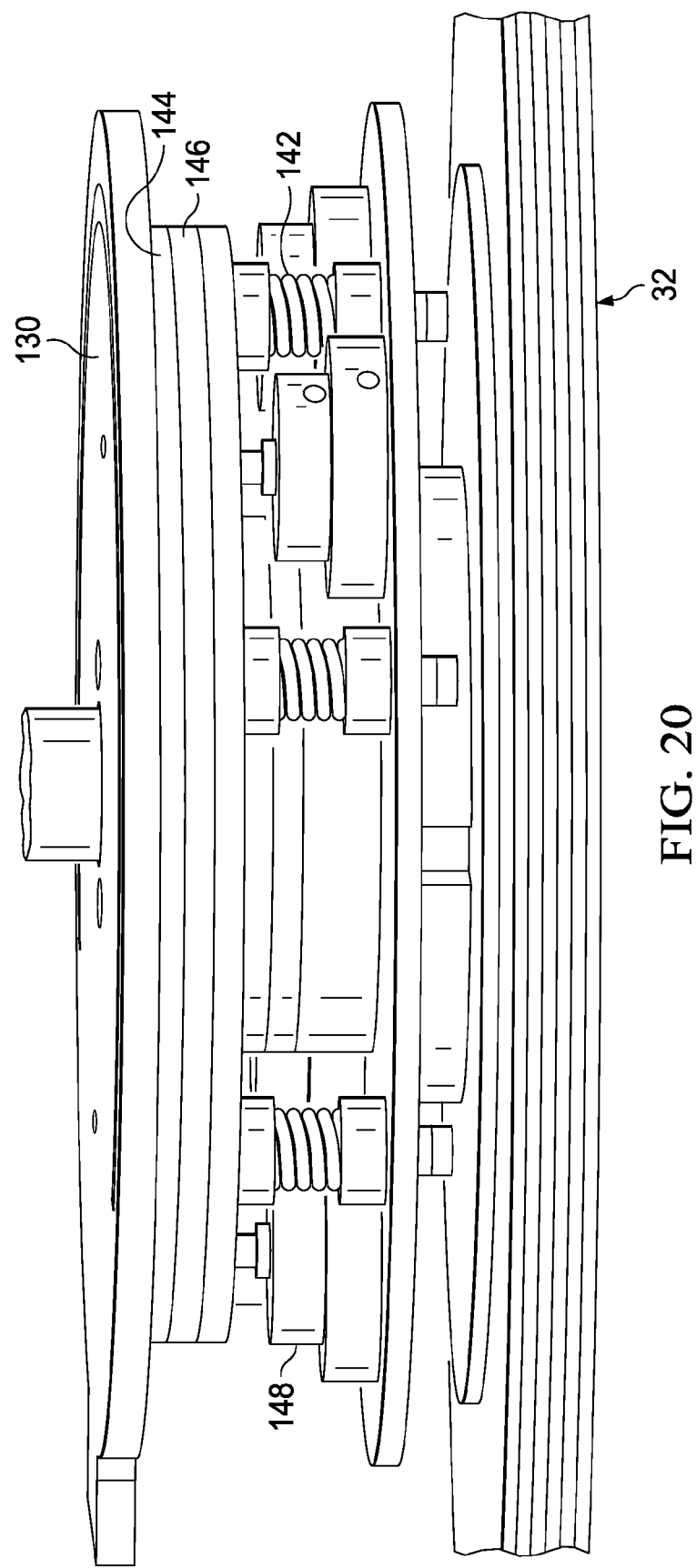
FIG. 20 is an enlarged side perspective view of the locking mechanism of the star wheel shown in FIG. 17.

In the embodiment shown in FIGS. 17-21, a spring clutch system 140 is used (see FIGS. 20 and 21). The spring clutch can be in any suitable configuration. The spring clutch can be provided with any suitable number of springs. In the example shown, six compression springs 142 are used to lock the skillet plate 130 in place and keep the skillet plate from rotating. The springs 142 press upward on the elevation clutch plates 144 and 146 to prevent them from rotating. The elevation clutch plates 144 and 146 may have any suitable configuration. Suitable configurations include smooth plates with a relatively high coefficient of friction, or plates that are configured (such as with teeth or the like) to interlock with each other so that they do not rotate relative to each other when engaged. Four small air cylinders 148 are at least indirectly joined to the lower clutch plate 146. If the clutch plates 144 and 146 are plastic, an optional reinforcing plate 150 can be positioned between the lower clutch plate 146 and the air cylinders to absorb forces exerted by the springs 142 and air cylinders 148. When air is applied to the air cylinders 148, they pull the lower clutch plate 146 away from the upper clutch plate 144 (overpowering the springs) and create a gap between the plates. The skillet plate 130 is now free to rotate and the elevation can be adjusted.

The procedure for changing the elevation of the upper assembly 40 (when the rotary device is provided with an elevation locking mechanism) is as follows. The adjustment element 80 is raised until it is at the same elevation as the elevation adjustment initiation component (which in this embodiment is the "skillet plate" 130). The star wheel 22 is rotated until the skillet handle 132 is aligned with the adjustment element 80. The adjustment element 80 is extended so that the recess 134 in the skillet handle 132 is engaged. When the adjustment element 80 engages the skillet handle 132, a computer program in communication with the adjustment element 80 sends a signal to a solenoid valve. This triggers the supply of air to the air cylinders. When this occurs, the spring clutch system 140 is disengaged. The air cylinders 148 pull the clutch plates 144 and 146 apart so the skillet plate 130 and screw 120 are now free to spin. The rotatable elements 32 are rotated, but the adjustment element 80 prevents the skillet plate 130 from turning. This spins the screw 120 relative to the rest of the assembly, and the skillet plate 130 climbs upward (or moves downward). [The adjustment element 80 will move upward and downward with the skillet plate 130 in order to stay engaged with the same. If the adjustment element 80 has a thickness (e.g., vertical dimension) that is larger than the elevation change, then the skillet handle 132 and the skillet plate 130 can simply slide along the adjustment element 80, without any need for the adjustment element 80 to move upward or downward in order to stay engaged with the skillet plate 130. The upper assembly 40 is joined to the skillet plate 130, so it also moves upward (or downward). When the correct elevation is achieved, air to the air cylinders 148 is discharged and the springs 142 push the clutch plates 144 and 146 back together, locking in the elevation. The adjustment element 80 is then retracted.

As shown in FIGS. 17 and 18, the star wheel conveyor 22 may further comprise a mechanism for detecting the elevation of the upper assembly 40. Such a detection mechanism 152 can be useful in several situations. One situation is if the elevation change mechanism 30 does not precisely track the elevation of the upper assembly 40. Another situation is that the elevation of the upper assembly 40 may be subject to unintended changes such that the upper assembly 40 is not at the anticipated elevation. For instance, if the elevation of the upper assembly 40 can be moved (manually for maintenance, or during a large machine jam), the elevation of the upper assembly 40 may need to be detected. There are numerous alternative types of elevation detection mechanisms. Several are as follows. In one case, a 3D laser scanner can be provided that detects the position and elevation of all the rotatable elements 32 from the side. In another case, an ultrasonic or laser scanner may be fixed above the skillet plate 130 to determine the upper assembly 40 elevation and skillet handle 132 orientation. In another case, a probe can be mounted above the skillet plate that physically contacts the skillet plate 130 and then detects the skillet handle 132 orientation.

Numerous other embodiments of the elevation adjustment mechanism 30 are possible, a non-limiting number of which are described herein.

The elevation change system 30 can comprise a piston that is either air driven hydraulically actuated. Such an actuation system can, for example, be provided in the form of a two or three position system. This would not have infinite adjustability like the screw mechanism, but for many applications infinite adjustability is not necessary. For example, the elevation adjustment mechanism 30 may only need to provide a tall article (e.g., bottle) and a short article (bottle) setting. In such a system, the upper assembly 40 can be mounted on a cylinder that is actuated "up" for tall bottles and "down" for short bottles".

In other embodiments, where the drive shaft 36 is not configured for an elevation adjustment mechanism to fit therein (such as when the shaft 36 is solid), other types of elevation adjustment mechanisms 30 may be used. It is desirable for such elevation adjustment mechanisms to still be capable of adjusting the elevation of the rotatable elements 32, and to have a mechanism that permits the rotatable elements 32 to be rotated as a unit when the star wheel 22 is in operation. Since the elevation of the rotatable elements 32 will no longer be adjusted by a mechanism located inside the shaft 36, a mechanism that adjusts the elevation from a location outside the shaft 36 is used. Any suitable mechanism can be used including, but not limited to the external component and elevation locking system shown in FIGS. 17 and 18.

The drive motor 26 and any other motors (e.g., the ball screw motors) are typically powered by electric current. Wires may provide current from a source of electric current to the motor(s) to power the motors. In one embodiment, the motor position is controlled by a controller. Additional wires can be used to transmit the feedback of motor and/or disk position to the controller. The system for controlling the motors can be in the form of a closed loop control system that provides feedback to the controller of the true motor position with a measurement device such as an encoder or resolver. However, in other embodiments, the desired position can be commanded to an open loop device such as a stepper motor without position feedback. A computer and/or the controller can be located remotely from the rotary device and can communicate electrically with the motors. Communication is also possible between a computer and a controller or motor by wireless means using radio frequency, light, or sound.

The rotary device may be adjusted for a new shape and/or size article 10 manually, at least partially automatically, or if desired, fully automatically. For instance, the he computer can be provided with a computer-aided design ("CAD") software program such as SOLIDWORKS™ software available from Dassault Systems in which the CAD program can have a digital electronic representation of a three dimensional article 10 input into the program. A digital electronic representation of the adjustable star wheel (or other rotary device) can also be input into the program. The digital input of the article can include the dimensions of the three dimensional article 10 at levels or elevations corresponding to each of the disks 32. The input relating to the elevations of the disks (or other rotatable element or elements) can also include the dimensions of the article 10 within any range that the elevation of the disks may be adjusted. The relative angles and elevations of the digital electronic representation of the disks 32 can be adjusted to enable the control surfaces 72 to cooperate with the digital electronic representation of the article 10 and form a pocket 60 to support the article within the CAD software. The control surfaces 72 can be adjusted to be a desired offset dimension away from the surface of the article 10 to provide desired operating clearance and compensate for variation in article size. The relative angles and elevations of the rotatable elements 32 of the actual star wheel 22 can then be adjusted in the CAD program by the person operating the CAD program to match the configuration of the control surfaces and elevations of the digital electronic representation of the rotatable elements. The CAD program can, thus, be used by the person operating the CAD program to determine the necessary rotational angle and elevation for each of the disks 32 to create a pocket 60 to support the desired article geometry.

The computer can be in communication with the control system that controls the adjustment mechanism, such as the motor 26 to adjust the rotational (or angular) position and elevation of each of the star wheel disks 32 to create the pockets 60 to accommodate the dimensions of a three dimensional article 10. The "angular" position of the disks refers to the angle which the disks are rotated relative to an initial position. The CAD program can also be used to generate a table or list of numbers that describe a list of positions for each of the star wheel disks 32. This list of positions can be uploaded or manually entered (such as by a human operator) into a programmable logic controller (PLC) that controls the position of each disk 32. A programmable logic controller is a digital computer used for automation of electromechanical processes. The PLC may be a separate device, or it may be incorporated into the computer.

The process of using the CAD program to determine the rotary device adjustment setting can be further automated. For example, the operator can simply input a bottle file into the computer using macros in SOLIDWORKS™ or other software. Alternatively, a 3D scanner can be used to detect the bottle geometry. Then the geometry can be imported into the CAD program and the CAD program can automatically determine the settings for the rotatable element or elements. Then these settings could be sent to the PLC and the line changed over automatically. In such a process, the automated program will automatically determine the correct settings and rotate the disks 32. This can be much faster than a CAD operator electronically manipulating the star wheel 22 and bottle models to determine the correct settings for the rotary device.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "90 degrees" is intended to mean "about 90 degrees".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An adjustable rotary device system comprising:
    a) a rotary device having sites for holding three dimensional articles, said rotary device being capable of conveying said articles along an arcuate path, said rotary device comprising:
        at least one rotatable element having a center, two surfaces, and a periphery, said at least one rotatable element being rotatable in a plane of rotation about an axis in order to convey said articles, wherein said axis is generally perpendicular to the plane of rotation of said rotatable element; and
        a mechanism for rotating said rotatable element about said axis, said mechanism being at least indirectly mechanically coupled to said rotatable element; and
    b) an elevation change mechanism for adjusting the elevation of said rotatable element in a direction parallel to said axis, wherein said elevation change mechanism is selectively engageable with said mechanism for rotating said rotatable element, wherein said mechanism for rotating said rotatable element is also arranged to impart motion to said elevation change mechanism so that when said elevation change mechanism is engaged with said mechanism for rotating said rotatable element, the elevation change mechanism moves in the direction of said axis.

2. The adjustable rotary device system of claim 1 comprising an adjustable star wheel conveyor system wherein:
    the rotary device comprises a star wheel conveyor wherein said sites comprise pockets for said articles, and said star wheel conveyor comprises:
        a plurality of stacked individual rotatable elements, said rotatable elements each having a center, two surfaces, side edges, and peripheries, said individual rotatable elements being independently rotatable about said axis, and rotatable as a unit in order to convey such articles, wherein said axis is generally perpendicular to the surfaces of said rotatable elements, wherein said rotatable elements comprise portions on their side edges that define the boundaries of said pockets, wherein the pockets defined by said rotatable elements have an adjustable configuration to accommodate different size and/or shape articles, and wherein said rotatable elements have a difference in elevation therebetween in a direction parallel to said axis;
    the mechanism for rotating said rotatable element is configured to rotate said rotatable elements; and
    the elevation change mechanism is configured to adjust the elevation of one of more of said rotatable elements.

3. The adjustable star wheel system of claim 2 wherein the axis is vertical.

4. The adjustable star wheel system of claim 2 wherein the elevation change mechanism is selected from the group consisting of: a ball screw linear actuator; a screw mechanism; a piston mechanism; a linear drive mechanism; a rack and pinion system; a spring system; and a cable/pulley system.

5. The adjustable star wheel system of claim 2 wherein the elevation change mechanism comprises an internal screw mechanism aligned with said axis.

6. The adjustable star wheel system of claim 2 wherein the stack of rotatable elements comprises an upper assembly comprising two or more rotatable elements and a lower assembly comprising two or more rotatable elements, wherein said upper assembly of rotatable elements and said lower assembly of rotatable elements having a distance therebetween in the direction of said axis, wherein the elevation change mechanism is joined to one of said upper assembly of rotatable elements and lower assembly of rotatable elements, wherein the movement of said elevational change mechanism changes the distance between said upper assembly of rotatable elements and said lower assembly of rotatable elements.

7. The adjustable star wheel system of claim 2 further comprising an elevation locking mechanism having an engaged position and a disengaged position, wherein when said elevation locking mechanism is disengaged, the elevation change mechanism is movable in the direction of said axis in order to adjust the elevation of one or more of said rotatable elements; and when said elevation locking mechanism is engaged, the elevation of said rotatable elements is fixed and not able to move.

8. The adjustable star wheel system of claim 7 wherein the elevation locking mechanism comprises an elevation clutch system comprising a clutch plate that prevents the rotatable elements from moving in the direction of said axis when engaged and at least one spring that is positioned to exert a compressive force on the clutch plate in a direction generally parallel to said axis, wherein when said spring is in a first state of compression said rotatable elements are not movable in a direction of said axis, wherein said elevation locking mechanism further comprises a mechanism for disengaging said locking mechanism which at least partially uncompresses said spring so that said clutch plate can be moved in a direction of said axis to raise or lower one or more of said rotatable elements.

9. The adjustable star wheel system of claim 2 further comprising an adjustment mechanism for adjusting the relative elevation of one or more of the rotatable elements, wherein said adjustment mechanism comprises an adjustment element positioned to engage an initiation component on the star wheel conveyor in order to at least initiate adjustment of the elevation of one or more of said individual rotatable elements relative to the remaining rotatable elements in the stack of rotatable elements.

10. The adjustable star wheel system of claim 9 wherein said adjustment element is movable to engage said initiation component of said star wheel conveyor in order to at least initiate adjustment of the elevation of one or more of said individual rotatable elements relative to the remaining rotatable elements in the stack of rotatable elements.

11. The adjustable star wheel system of claim 9 wherein said adjustment mechanism comprises a support and said adjustment element is movably joined to said support to permit said adjustment element to move in at least one of the following directions to contact the initiation component of said star wheel conveyor in order to at least initiate adjustment of the vertical position of one or more of said individual rotatable elements: upwardly, downwardly, inwardly, outwardly, or laterally relative to the axis of said rotatable elements.

12. The adjustable star wheel system of claim 11 wherein the support of the adjustment mechanism is located outside the peripheries of the rotatable elements.

13. The adjustable star wheel system of claim 11 wherein the adjustment element is movable inwardly to contact the initiation component of said star wheel conveyor in order to at least initiate adjustment of the vertical position of one or more of said individual rotatable elements.

14. An adjustable star wheel system comprising:
a) a star wheel conveyor for conveying three dimensional articles within pockets along an arcuate path, said star wheel conveyor comprising:
  a plurality of stacked individual rotatable elements, said rotatable elements each having a center, two surfaces, side edges, and peripheries, said individual rotatable elements being independently rotatable about an axis that passes through their centers, and rotatable as a unit in order to convey such articles, wherein said axis is generally perpendicular to the surfaces of said rotatable elements, wherein said rotatable elements comprise portions on their side edges that define the boundaries of said pockets, wherein the pockets defined by said rotatable elements have an adjustable configuration to accommodate different size and/or shape articles, and wherein said rotatable elements have a difference in elevation therebetween in a direction parallel to said axis; and
  a mechanism for rotating one or more of said rotatable elements about said axis, said mechanism being mechanically coupled to said rotatable elements through a hollow drive shaft; and
b) an elevation change mechanism for adjusting the elevation of said rotatable element in a direction parallel to said axis, wherein said elevation change mechanism is at least indirectly mechanically coupled to one or more of said rotatable elements through an inner shaft that is located inside of said hollow drive shaft, and said elevation change mechanism is selectively engageable with said mechanism for rotating said rotatable element, wherein said mechanism for rotating said rotatable element is also arranged to impart motion to said elevation change mechanism so that when said elevation change mechanism is engaged with said mechanism for rotating said rotatable element, the elevation change mechanism moves in the direction of said axis.

15. A method for adjusting the elevation of a rotatable element on a rotary device, said method comprising the steps of:
a) providing a rotary device system comprising:
  1) a rotary device having sites for holding three dimensional articles, said rotary device being capable of conveying said articles along an arcuate path, said rotary device comprising:
    at least one rotatable element having a center, two surfaces, and a periphery, said at least one rotatable element being rotatable about an axis in a plane of rotation in order to convey such articles, wherein said axis is generally perpendicular to the plane of rotation of said rotatable element; and
    a mechanism for rotating said rotatable element about said axis, said mechanism being mechanically coupled to said rotatable element; and
  2) an elevation change mechanism for adjusting the elevation of said rotatable element in a direction parallel to said axis, wherein said elevation change mechanism is selectively engageable with said mechanism for rotating said rotatable element wherein said mechanism for rotating said rotatable element is also arranged to impart motion to said elevation change mechanism so that when said elevation change mechanism is engaged with said mechanism for rotating said rotatable element, the elevation change mechanism moves in the direction of said axis; and
b) engaging the elevation change mechanism with the mechanism for rotating said rotatable element, and causing said mechanism for rotating said rotatable element to rotate so that the elevation change mechanism moves in the direction of said axis to adjust the elevation of said rotatable element.

\* \* \* \* \*